(12) United States Patent
Baek et al.

(10) Patent No.: US 11,847,947 B2
(45) Date of Patent: Dec. 19, 2023

(54) FLEXIBLE DISPLAY DEVICE FOR DETECTING DEFORMATION POSITION AND DEFORMATION AMOUNT AND ELECTRONIC DEVICE INCLUDING THE SAME

(71) Applicant: Samsung Display Co., Ltd., Yongin-si (KR)

(72) Inventors: Yunki Baek, Suwon-si (KR); Joon-Chul Goh, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/893,585

(22) Filed: Aug. 23, 2022

(65) Prior Publication Data

US 2023/0125796 A1 Apr. 27, 2023

(30) Foreign Application Priority Data

Oct. 27, 2021 (KR) .................. 10-2021-0144861

(51) Int. Cl.
*G09G 3/00* (2006.01)
*G01B 7/16* (2006.01)
*G09G 3/20* (2006.01)

(52) U.S. Cl.
CPC .............. *G09G 3/035* (2020.08); *G01B 7/18* (2013.01); *G09G 3/2007* (2013.01);
(Continued)

(58) Field of Classification Search
CPC ................ G09G 3/035; G09G 3/2007; G09G 2320/0223; G09G 2320/0233; G09G 2320/0242; G09G 2330/021; G01B 7/18
(Continued)

(56) References Cited

U.S. PATENT DOCUMENTS

2003/0122759 A1* 7/2003 Abe .................. G09G 3/22
345/89
2008/0062155 A1* 3/2008 Wang ................ G09G 3/3648
345/204
(Continued)

FOREIGN PATENT DOCUMENTS

CN 106910842 A 6/2017
KR 1020190026497 A 3/2019
(Continued)

OTHER PUBLICATIONS

Partial European Search Report for Application No. 22203880.4-1210 dated Feb. 15, 2023.
(Continued)

*Primary Examiner* — Prabodh M Dharia
(74) *Attorney, Agent, or Firm* — CANTOR COLBURN LLP

(57) ABSTRACT

A flexible display device includes: a flexible display panel including a plurality of pixels, a power supply line coupled to the plurality of pixels, and at least one measuring line; a power management circuit, which supplies a power supply voltage to the plurality of pixels through the power supply line; and a display driver, which drives the flexible display panel. The display driver senses a resistance of the at least one measuring line, and detects at least one of a deformation position and a deformation amount of the flexible display panel based on the sensed resistance.

18 Claims, 21 Drawing Sheets

(52) U.S. Cl.
CPC ............. *G09G 2320/0223* (2013.01); *G09G 2320/0233* (2013.01); *G09G 2320/0242* (2013.01); *G09G 2330/021* (2013.01)

(58) Field of Classification Search
USPC .......................................................... 345/212
See application file for complete search history.

(56) References Cited

U.S. PATENT DOCUMENTS

| | | | | |
|---|---|---|---|---|
| 2011/0134087 | A1* | 6/2011 | Moriwaki | G09G 3/20 345/204 |
| 2013/0265262 | A1* | 10/2013 | Jung | G06F 3/0488 345/173 |
| 2014/0015743 | A1* | 1/2014 | Seo | G06F 1/3262 345/156 |
| 2016/0077553 | A1* | 3/2016 | Hyun | G09G 3/035 345/690 |
| 2016/0190216 | A1* | 6/2016 | Yang | G02F 1/133305 257/40 |
| 2017/0060189 | A1* | 3/2017 | Sohn | G06F 3/017 |
| 2017/0123558 | A1 | 5/2017 | Hong et al. | |
| 2018/0032106 | A1* | 2/2018 | Yu | G06F 1/1652 |
| 2018/0137801 | A1* | 5/2018 | An | G06T 3/0093 |
| 2018/0174523 | A1* | 6/2018 | Jeon | H01L 51/0097 |
| 2019/0074332 | A1* | 3/2019 | Kim | H01L 27/3276 |
| 2020/0073443 | A1* | 3/2020 | Seo | G06F 3/0482 |
| 2020/0211470 | A1* | 7/2020 | Lim | H01L 51/5253 |
| 2021/0241666 | A1 | 8/2021 | Gupta et al. | |

FOREIGN PATENT DOCUMENTS

| | | |
|---|---|---|
| KR | 1020190110167 A | 9/2019 |
| KR | 102190140 B1 | 12/2020 |
| KR | 1020160096774 A | 7/2021 |

OTHER PUBLICATIONS

Extended European Search Report for Application No. 22203880.4-1210 dated May 19, 2023.

* cited by examiner

FLEXIBLE DISPLAY DEVICE FOR DETECTING DEFORMATION POSITION AND DEFORMATION AMOUNT AND ELECTRONIC DEVICE INCLUDING THE SAME

This application claims priority to Korean Patent Application No. 10-2021-0144861, filed on Oct. 27, 2021, and all the benefits accruing therefrom under 35 U.S.C. § 119, the content of which in its entirety is herein incorporated by reference.

BACKGROUND

1. Field

Embodiments relate to a display device, and more particularly to a flexible display device, and an electronic device including the flexible display device.

2. Description of the Related Art

A flexible display device, such as a foldable display device or a rollable display device having a flexible display panel, at least a portion of which is deformable (e.g., foldable or bendable), has been developed. In the flexible display device, the flexible display panel may be deformed by a user.

However, in a case where the flexible display panel is deformed (e.g., folded or bent), resistances of lines (e.g., a power supply line) within the flexible display panel may be increased. By this increase of the resistances, luminance uniformity of the flexible display panel may be decreased, and color deviation may occur in an image displayed at the flexible display panel.

SUMMARY

Some embodiments provide a flexible display device capable of detecting at least one of a deformation position and a deformation amount Some embodiments provide an electronic device including the flexible display device.

According to embodiments, there is provided a flexible display device including: a flexible display panel, a power management circuit and a display driver. The flexible display panel includes a plurality of pixels, a power supply line coupled to the plurality of pixels, and at least one measuring line. The power management circuit supplies a power supply voltage to the plurality of pixels through the power supply line. The display driver drives the flexible display panel. The display driver senses a resistance of the at least one measuring line, and detects at least one of a deformation position and a deformation amount of the flexible display panel based on the sensed resistance.

In embodiments, the display driver may include a resistance-deformation amount model storage, which stores resistance-deformation amount model information about a deformation amount value of the flexible display panel corresponding to a resistance value of the at least one measuring line.

In embodiments, the display driver may include a resistance-voltage drop model storage, which stores resistance-voltage drop model information about a voltage drop amount of the power supply voltage at the power supply line corresponding to a resistance value of the at least one measuring line.

In embodiments, the display driver may determine the voltage drop amount of the power supply voltage corresponding to the sensed resistance of the at least one measuring line by using the resistance-voltage drop model information, and the power management circuit may increase a voltage level of the power supply voltage by the determined voltage drop amount.

In embodiments, the flexible display panel may be a foldable display panel having a fixed bendable position. The flexible display panel may include, as the at least one measuring line, an outer measuring line surrounding a display region of the flexible display panel.

In embodiments, the display driver may apply a current to a first end of the outer measuring line, and may sense a resistance of the outer measuring line by measuring a voltage of a second end of the outer measuring line. The display driver may detect the deformation amount of the flexible display panel based on the resistance of the outer measuring line.

In embodiments, the flexible display panel may be a foldable display panel having a fixed bendable position. The flexible display panel may include, as the at least one measuring line, a first measuring line extending from the display driver to a first position that is closer to the display driver than the bendable position, and a second measuring line extending from the display driver to a second position that is farther from the display driver than the bendable position. The first and second positions are located in the flexible display panel In embodiments, the display driver may sense a first resistance of the first measuring line and a second resistance of the second measuring line, and may detect the deformation amount of the flexible display panel based on a difference between the first resistance of the first measuring line and the second resistance of the second measuring line.

In embodiments, the flexible display panel may be a foldable display panel having a fixed first bendable position and a fixed second bendable position. The flexible display panel may include, as the at least one measuring line, a first measuring line extending from the display driver to a first position that is closer to the display driver than the first bendable position, a second measuring line extending from the display driver to a second position that is farther from the display driver than the first bendable position and closer to the display driver than the second bendable position, and a third measuring line extending from the display driver to a third position that is farther from the display driver than the second bendable position. The first, second, third positions are located in the flexible display panel.

In embodiments, the display driver may sense a first resistance of the first measuring line, a second resistance of the second measuring line and a third resistance of the third measuring line. Based on a first difference between the first resistance of the first measuring line and the second resistance of the second measuring line, the display driver may detect whether the flexible display panel is bent at the first bendable position, and may detect the deformation amount at the first bendable position. Based on a second difference between the second resistance of the second measuring line and the third resistance of the third measuring line, the display driver may detect whether the flexible display panel is bent at the second bendable position, and may detect the deformation amount at the second bendable position.

In embodiments, the flexible display panel may be a foldable display panel that is able to be bent at any position. The flexible display panel may include, as the at least one measuring line, a plurality of measuring lines extending from the display driver to different positions therein, respectively.

In embodiments, the display driver may sense resistances of the plurality of measuring lines. In a case where a difference between the resistances of two measuring lines extending to adjacent two positions among the plurality of measuring lines is greater than a reference resistance, the display driver may determine that the deformation position of the flexible display panel is between the adjacent two positions.

In embodiments, the display driver may detect the deformation amount at the deformation position based on the difference between the resistances of the two measuring lines.

In embodiments, the display driver may include a resistance-data compensation model storage, which stores resistance-data compensation model information about a data compensation value corresponding to a resistance value of the at least one measuring line.

In embodiments, the display driver may compensate input image data based on the sensed resistance of the at least one measuring line and the resistance-data compensation model information.

In embodiments, the display driver may determine the data compensation value corresponding to the sensed resistance of the at least one measuring line based on the resistance-data compensation model information, and may compensate input image data by adding the data compensation value to a gray level represented by the input image data.

In embodiments, the flexible display panel may include, as the at least one measuring line, a plurality of measuring lines extending from the display driver to different positions therein respectively. The display driver may sense resistances of the plurality of measuring lines. In a case where a difference between the resistances of two measuring lines extending to adjacent two positions of the different positions among the plurality of measuring lines is greater than a reference resistance, the display driver may compensate input image data by gradually increasing the input image data for pixels of the plurality of pixels located between the adjacent two positions and located farther from the display driver than the adjacent two positions.

According to embodiments, there is provided a flexible display device including a flexible display panel, a power management circuit, and a power management circuit. The flexible display panel includes a plurality of pixels, and a power supply line coupled to the plurality of pixels. The power management circuit supplies a power supply voltage to the plurality of pixels through the power supply line. The display driver drives the flexible display panel. The flexible display panel further includes a plurality of measuring lines extending from the display driver to different positions, respectively. The display driver senses resistances of the plurality of measuring lines, and detects at least one of a deformation position and a deformation amount of the flexible display panel based on differences of the resistances of the plurality of measuring lines.

According to embodiments, there is provided an electronic device including a host processor, which generates input image data, and a flexible display device, which displays an image based on the input image data. The flexible display device includes: a flexible display panel including a plurality of pixels, a power supply line coupled to the plurality of pixels, and at least one measuring line; a power management circuit, which supplies a power supply voltage to the plurality of pixels through the power supply line; and a display driver, which drives the flexible display panel. The display driver senses a resistance of the at least one measuring line, detects at least one of a deformation position and a deformation amount of the flexible display panel based on the sensed resistance, and provides deformation information representing the at least one of the deformation position and the deformation amount to the host processor.

In embodiments, in case where the deformation information indicates that the flexible display panel is deformed while the flexible display panel displays a moving image, the host processor adjusts the input image data based on the deformation information such that a region of the flexible display panel displaying the moving image is changed.

As described above, in a flexible display device and an electronic device including the flexible display device according to embodiments, a display driver may sense a resistance of at least one measuring line, and may detect at least one of a deformation position and a deformation amount of a flexible display panel based on the sensed resistance. Accordingly, the deformation position and/or the deformation amount of the flexible display panel may be efficiently and accurately detected.

Further, in the flexible display device and the electronic device according to embodiments, a power supply voltage or input image data may be compensated based on the deformation position and/or the deformation amount. Accordingly, even if the flexible display panel is deformed, deterioration of luminance uniformity and color deviation of the flexible display panel may be effectively prevented or reduced.

BRIEF DESCRIPTION OF THE DRAWINGS

Illustrative, non-limiting embodiments will be more clearly understood from the following detailed description in conjunction with the accompanying drawings.

FIG. 1C is a diagram illustrating an example of resistances of first through third measuring lines in a case where a flexible display panel is bent at a second bendable position.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, embodiments of the present inventive concept will be explained in detail with reference to the accompanying drawings.

Figure 1:
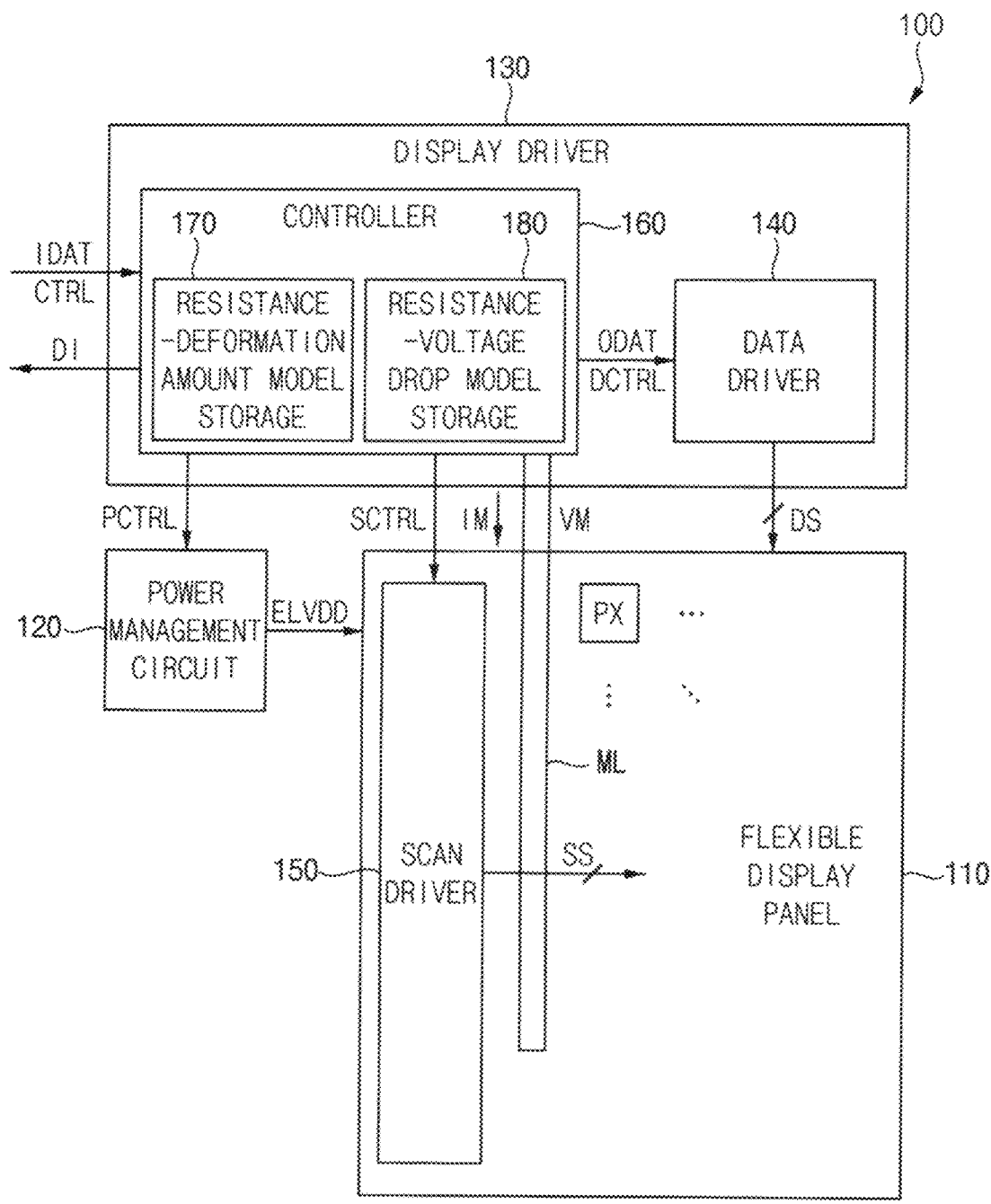
FIG. 1 is a block diagram illustrating a flexible display device according to embodiments.
Figure 2A:
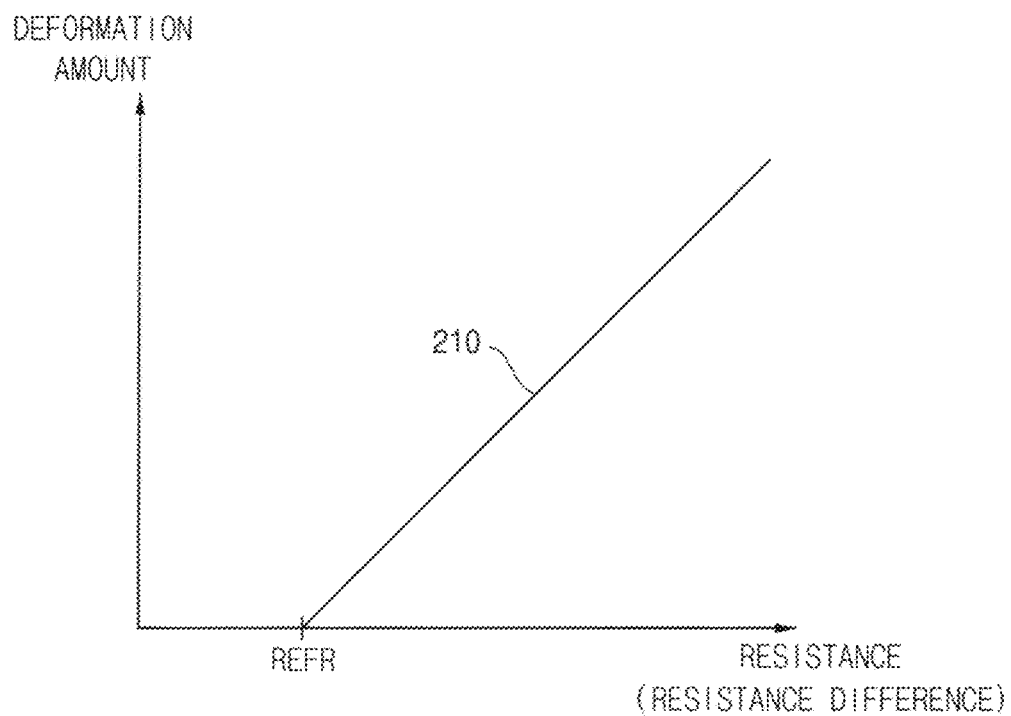
FIG. 2A is a diagram illustrating an example of a resistance-deformation amount model.
Figure 2B:
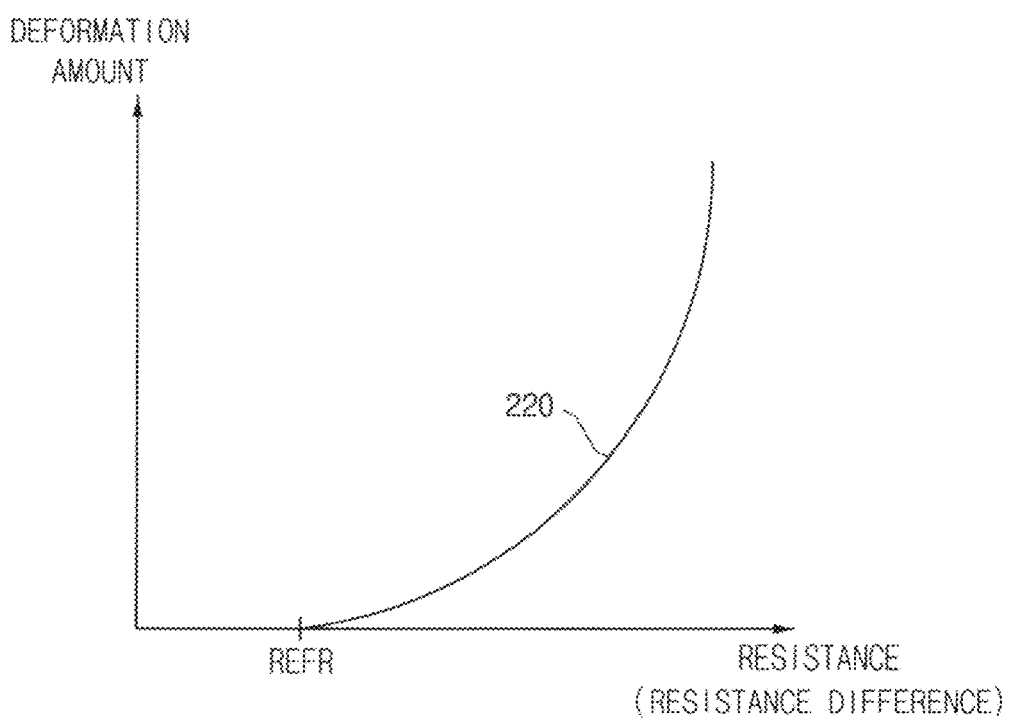
FIG. 2B is a diagram illustrating another example of a resistance-deformation amount model.
Figure 3A:
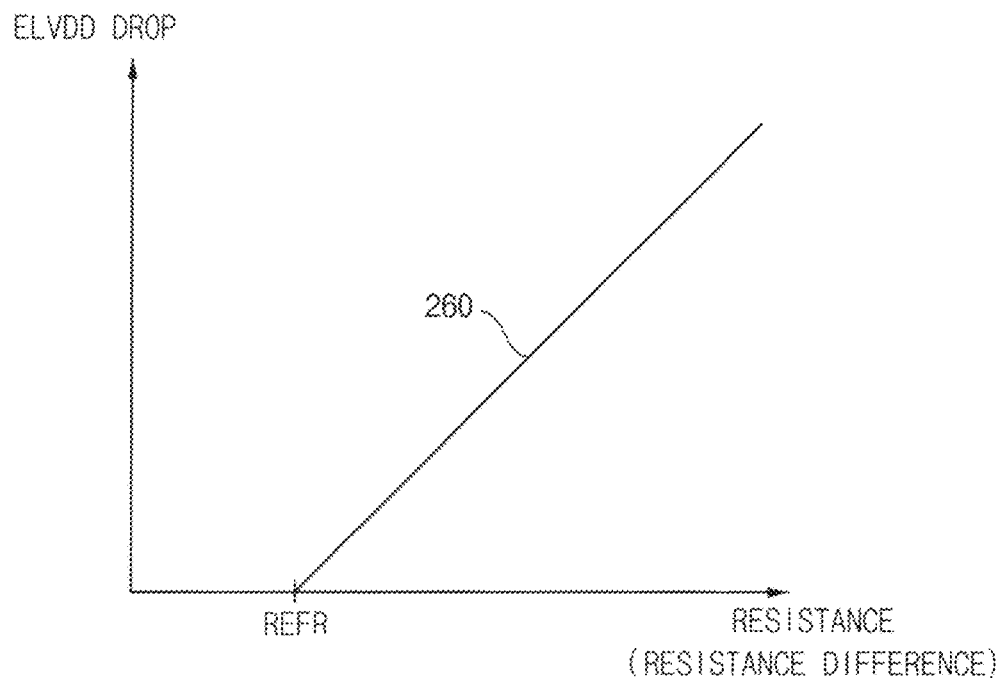
FIG. 3A is a diagram illustrating an example of a resistance-voltage drop model.
Figure 3B:
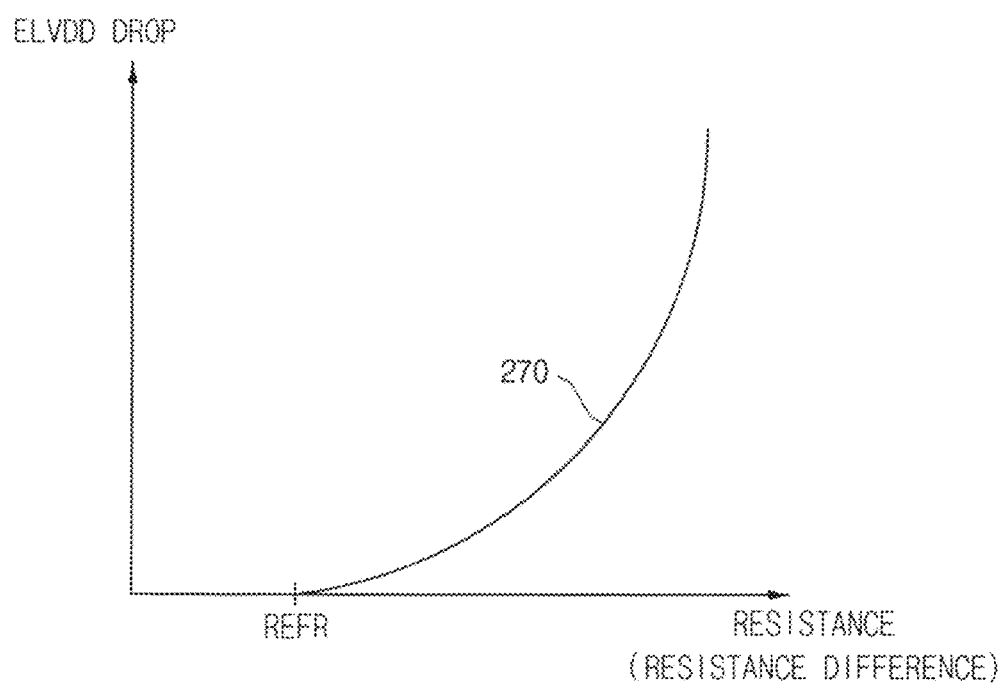
FIG. 3B is a diagram illustrating another example of a resistance-voltage drop model.

FIG. 1 is a block diagram illustrating a flexible display device according to embodiments, FIG. 2A is a diagram illustrating an example of a resistance-deformation amount model, FIG. 2B is a diagram illustrating another example of a resistance-deformation amount model, FIG. 3A is a diagram illustrating an example of a resistance-voltage drop model, and FIG. 3B is a diagram illustrating another example of a resistance-voltage drop model according to an embodiment.

Referring to FIG. 1, a flexible display device 100 according to embodiments may include a flexible display panel 110, a power management circuit 120 that supplies a power supply voltage ELVDD to the flexible display panel 110, and a display driver 130 that drives the flexible display panel 110. The display driver 130 may include a data driver 140 that provides data signals DS to the flexible display panel 110, and a controller 160 that controls an operation of the flexible display device 100. In some embodiments, the flexible display device 100 may further include a scan driver 150 that provides scan signals SS to the flexible display panel 110.

The flexible display panel 110 may be any deformable display panel. For example, the flexible display panel 110 may be any flexible display panel, such as a foldable display panel, a rollable display panel, a curved display panel, a bended display panel, a stretchable display panel, or the like.

Figure 4:
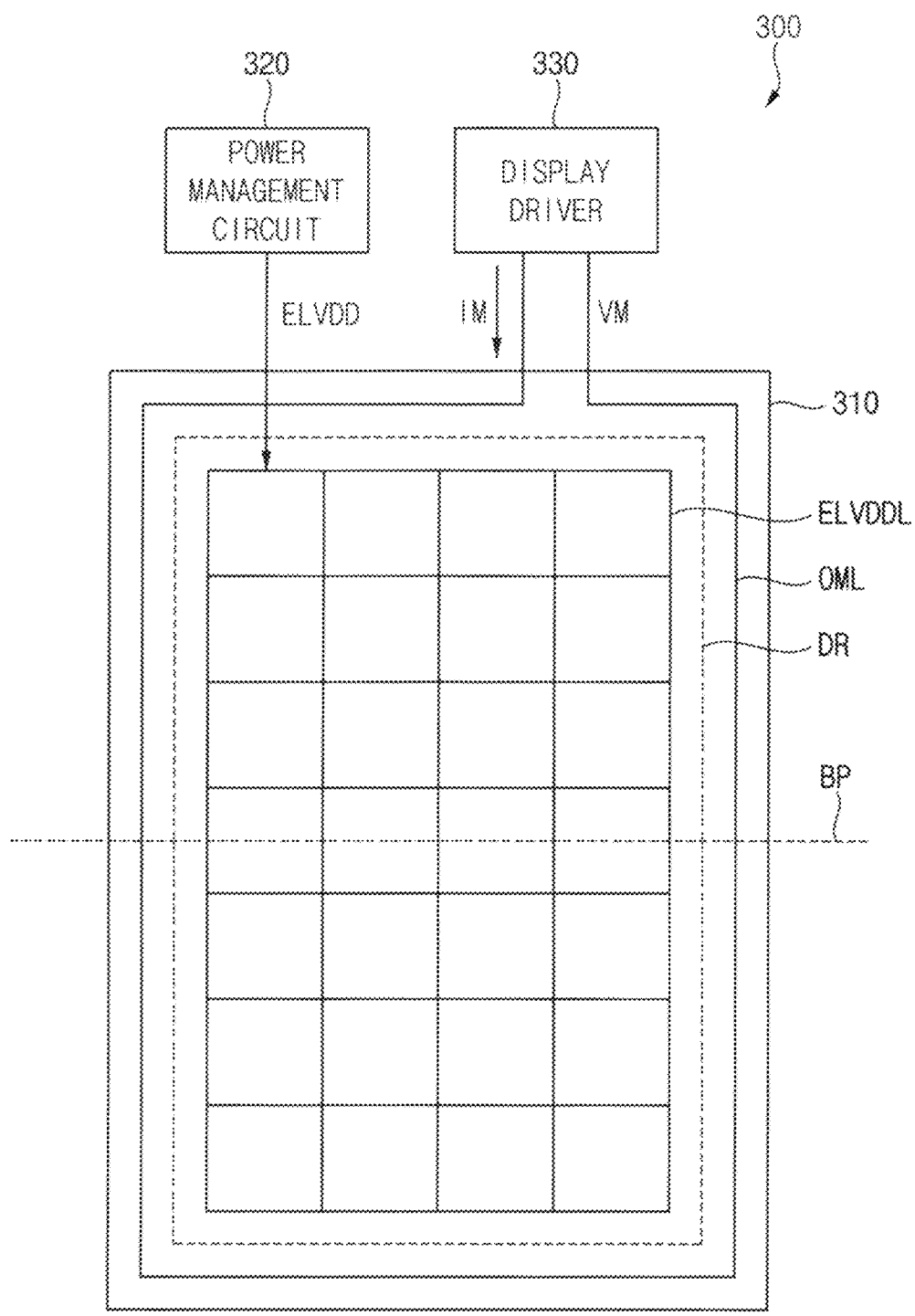
FIG. 4 is a diagram illustrating a flexible display device having one fixed bendable position according to embodiments.

The flexible display panel 110 may include a plurality of pixels PX in a display region DR therein (See FIG. 4). In some embodiments, each pixel PX may include a light emitting element, and the flexible display panel 110 may be a light emitting display panel. For example, the flexible display panel 110 may be, but not limited to, an organic light emitting diode ("OLED") display panel, a quantum dot ("QD") display panel, or the like. In other embodiments, the flexible display panel 110 may be a liquid crystal display ("LCD") panel, or any other suitable display panel.

The flexible display panel 110 may further include a power supply line coupled to the plurality of pixels PX. The power supply line may be a line for supplying the power supply voltage ELVDD (e.g., a high-power supply voltage) generated by the power management circuit 120 to the plurality of pixels PX. In some embodiments, the power supply line may have, but not limited to, a mesh structure.

Figure 7:
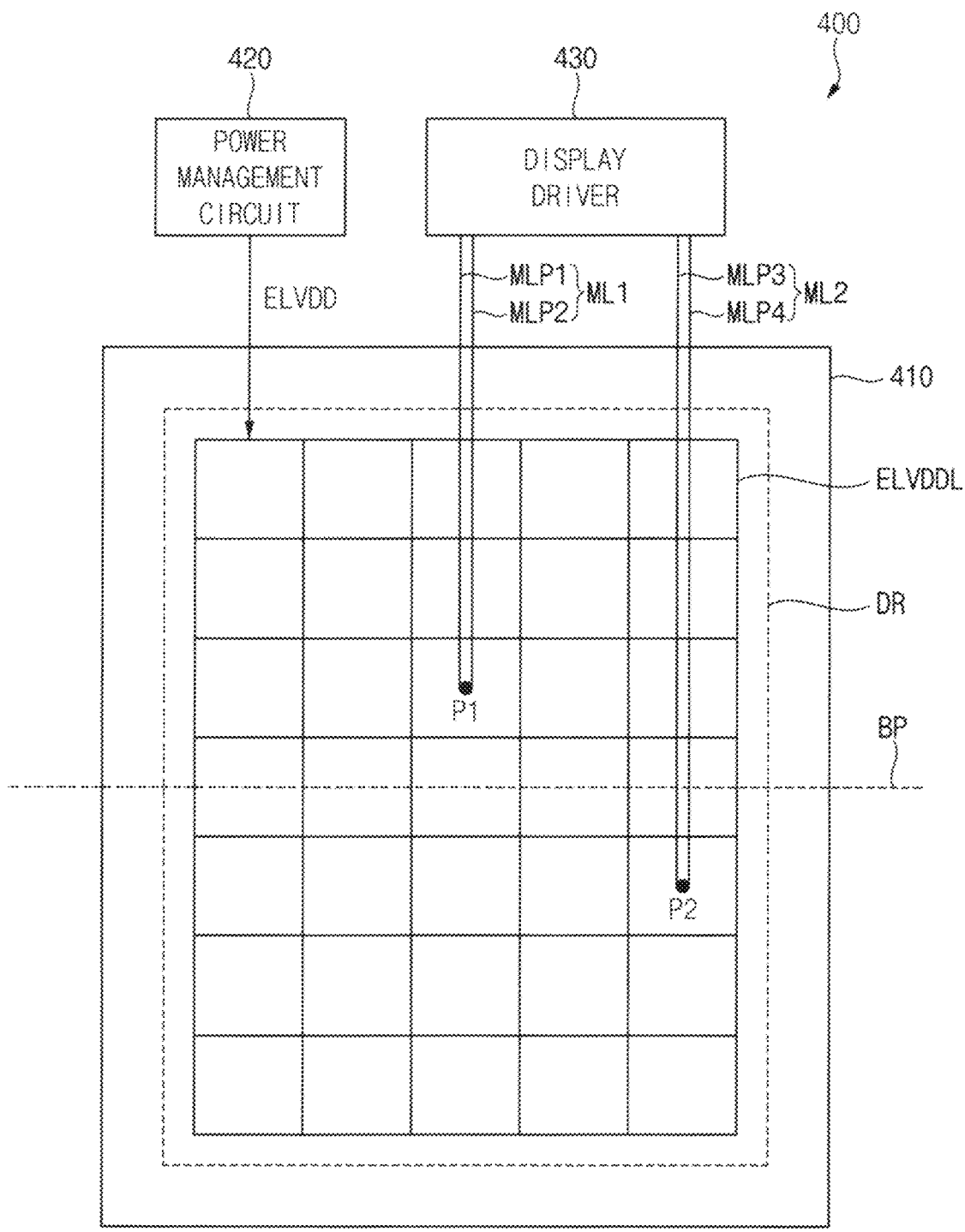
FIG. 7 is a diagram illustrating a flexible display device having one fixed bendable position according to embodiments.
Figure 9:
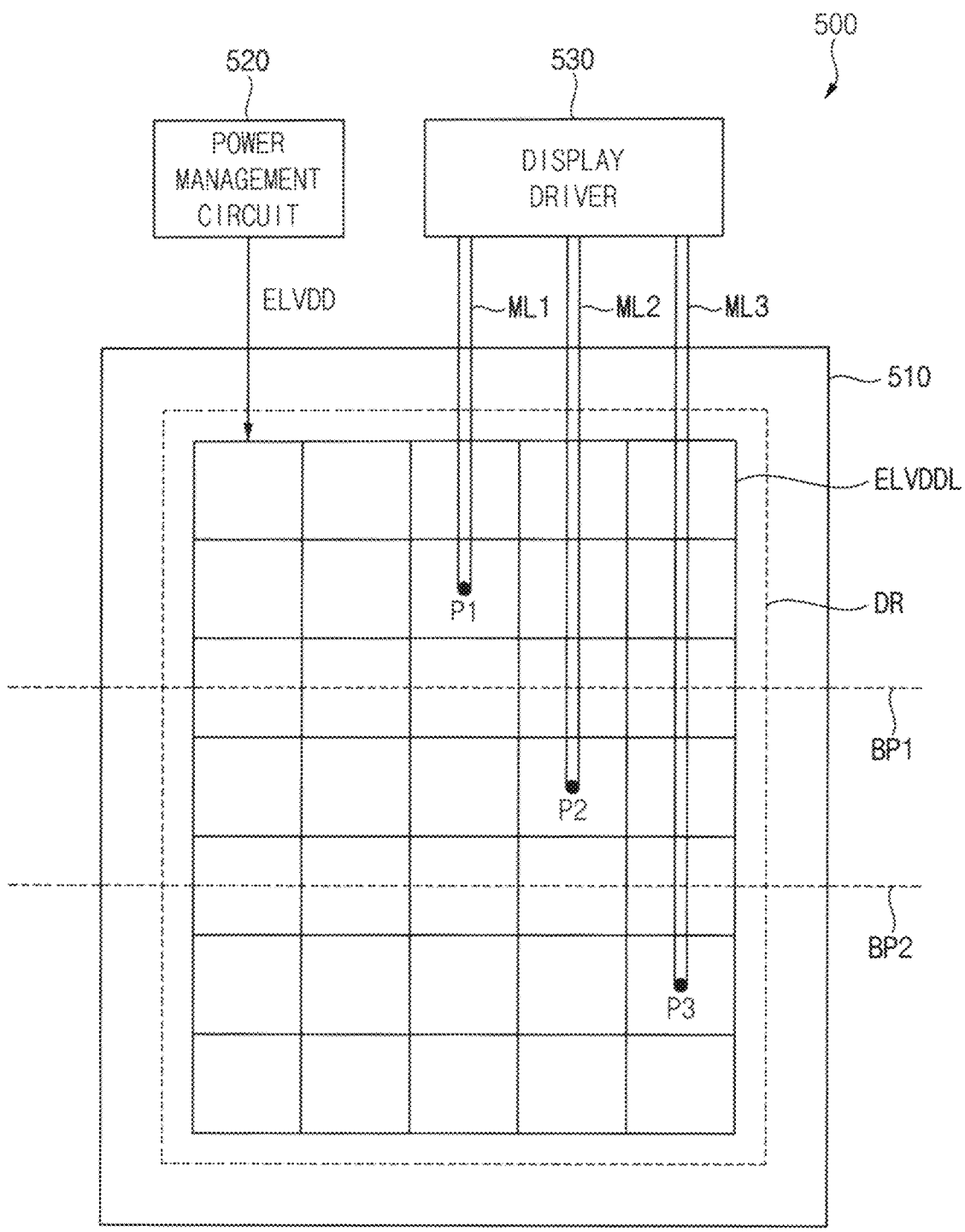
FIG. 9 is a diagram illustrating a flexible display device having two fixed bendable positions according to embodiments.
Figure 12:
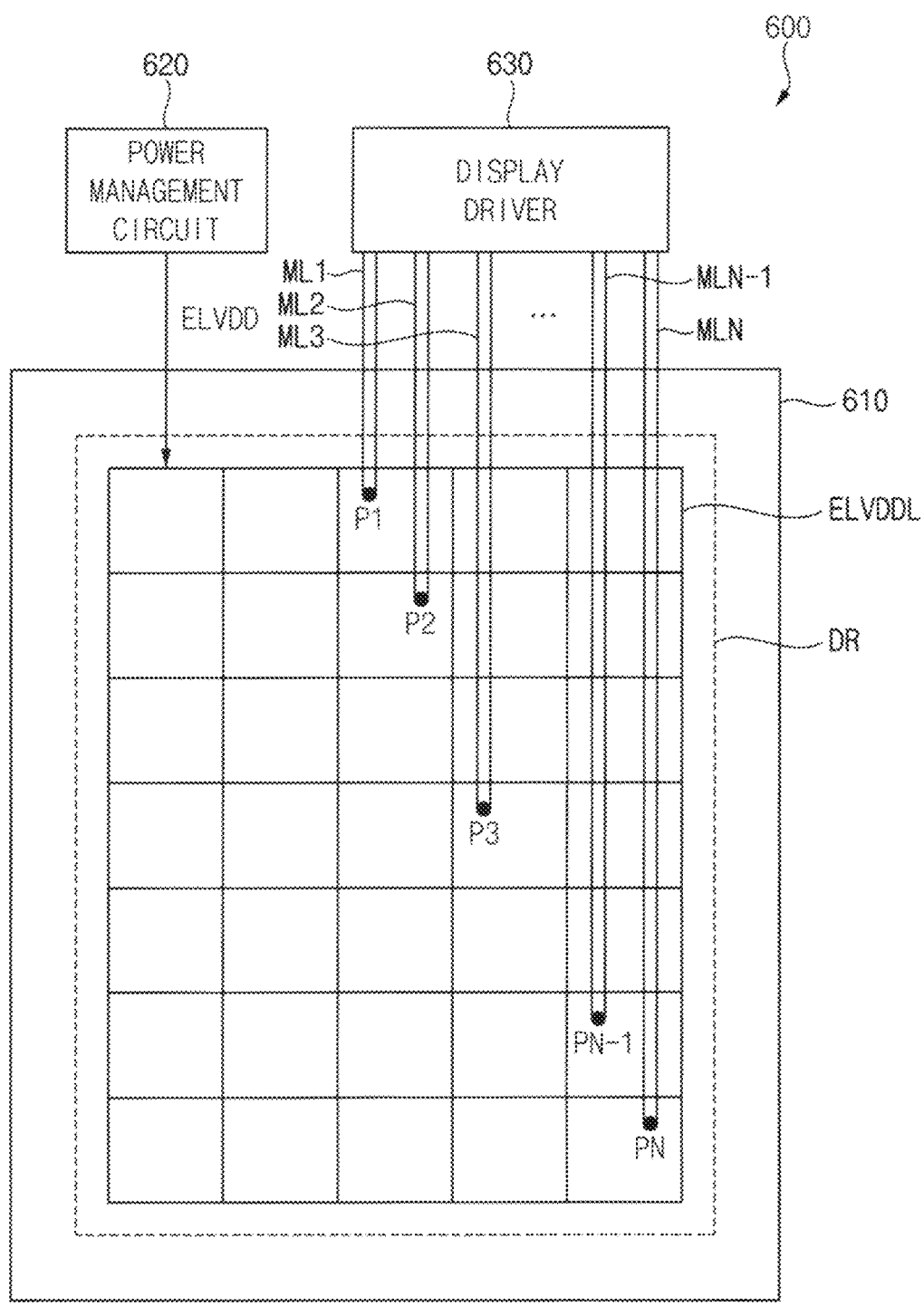
FIG. 12 is a diagram illustrating a flexible display device including a foldable display panel that is able to be bent at any position according to embodiments.

The flexible display panel 110 may further include at least one measuring line ML. A resistance of the at least one measuring line ML may be sensed or measured to detect a deformation position and/or a deformation amount (or a deformation degree) of the flexible display panel 110. In some embodiments, as illustrated in FIG. 4, the at least one measuring line ML may be an outer measuring line OML surrounding the display region DR in which the plurality of pixels PX is disposed. In other embodiments, as illustrated in FIGS. 7, 9 and 12, the at least one measuring line ML may include a plurality of measuring lines ML1, ML2, ML3, ..., MLN−1 and MLN extending to a plurality of positions P1, P2, P3, ..., PN−1 and PN, respectively.

The power management circuit 120 may supply the power supply voltage ELVDD to the plurality of pixels PX through the power supply line. In some embodiments, the power management circuit 120 may adjust a voltage level of the power supply voltage ELVDD in response to a power control signal PCTRL received from the controller 160. In some embodiments, the power management circuit 120 may be implemented with an integrated circuit, and the integrated circuit may be referred to as a power management integrated circuit ("PMIC"). In other embodiments, the power management circuit 120 may be included in the display driver 130 or the controller 160.

The data driver 140 may generate the data signals DS based on output image data ODAT and a data control signal DCTRL received from the controller 160, and may provide the data signals DS to the plurality of pixels PX through a plurality of data lines. In some embodiments, the data control signal DCTRL may include, but not limited to, a data enable signal, a horizontal start signal and a load signal. In some embodiments, the data driver 140 and the controller 160 may be implemented with a single integrated circuit, and the single integrated circuit may be referred to as a timing controller embedded data driver ("TED") integrated circuit. In other embodiments, the data driver 140 and the controller 160 may be implemented with separate integrated circuits from each other.

The scan driver 150 may generate the scan signals SS based on a scan control signal SCTRL received from the controller 160, and may sequentially provide the scan signals SS to the plurality of pixels PX on a row-by-row basis through a plurality of scan lines. In some embodiments, the scan control signal SCTRL may include, but not limited to, a scan start signal and a scan clock signal. In some embodiments, as illustrated in FIG. 1, the scan driver 150 may be integrated or disposed in a peripheral region adjacent to (or within) the display region of the flexible display panel 110. In other embodiments, the scan driver 150 may be implemented with one or more integrated circuits.

The controller 160 (e.g., a timing controller ("TCON")) may receive input image data IDAT and a control signal CTRL from an external host processor (e.g., an application processor ("AP"), a graphics processing unit ("GPU") or a graphics card). In some embodiments, the input image data IDAT may be, but not limited to, RGB image data including red image data, green image data and blue image data. In some embodiments, the control signal CTRL may include, but not limited to, a vertical synchronization signal, a horizontal synchronization signal, an input data enable signal, a master clock signal, etc. The controller 160 may generate the output image data ODAT based on the input image data IDAT, and may generate the data control signal DCTRL and the scan control signal SCTRL based on the control signal CTRL. The controller 160 may control an operation of the data driver 140 by providing the output image data ODAT and the data control signal DCTRL to the data driver 140, and may control an operation of the scan driver 150 by providing the scan control signal SCTRL to the scan driver 150.

In the flexible display device 100 according to embodiments, the display driver 130 (or the controller 160) may sense (or measure) the resistance of the at least one measuring line ML of the flexible display panel 110. For example, the display driver 130 (or the controller 160) may apply a current IM to a first end of the measuring line ML, may measure a voltage VM of a second end of the measuring line ML (or a voltage between the first end and a second end of the measuring line ML), and may determine the resistance of the measuring line ML based on the current IM and the voltage VM (e.g., using ohm's law).

Further, the display driver 130 (or the controller 160) may detect at least one of the deformation position and the deformation amount (or the deformation degree) of the flexible display panel 110 based on the sensed resistance of the at least one measuring line ML. In some embodiments, the display driver 130 (or the controller 160) may generate deformation information DI representing at least one of the deformation position and the deformation amount, and may provide the deformation information DI to the external host processor.

In some embodiments, the flexible display panel 110 may have one or more fixed bendable positions, and the display driver 130 may determine one of the fixed bendable positions as the deformation position of the flexible display panel 110 based on the sensed resistance of the at least one measuring line ML. In other embodiments, the flexible display panel 110 may include, as the at least one measuring line ML, the plurality of measuring lines extending from the display driver 130 to different positions. In this case, the display driver 130 may determine two measuring lines extending to adjacent two positions, respectively, and having a resistance difference greater than a reference resistance therebetween among the plurality of measuring lines, and may determine that the deformation position of the flexible display panel 110 is between the adjacent two positions.

In some embodiments, the display driver 130 may include a resistance-deformation amount model storage 170 that stores resistance-deformation amount model information about a deformation amount value of the flexible display panel 110 corresponding to a resistance value (or a resistance difference value) of the at least one measuring line ML. The display driver 130 may determine the deformation amount of the flexible display panel 110 corresponding to the sensed resistance of the at least one measuring line ML by using the resistance-deformation amount model information stored in the resistance-deformation amount model storage 170. The resistance-deformation amount model information may be stored as various forms, for example, a lookup table or an equation.

In some embodiments, the resistance-deformation amount model information stored in the resistance-deformation amount model storage 170 may be determined through experiments for the flexible display device 100. For example, as illustrated in FIG. 2A, the resistance-deformation amount model information stored in the resistance-deformation amount model storage 170 may represent a linear relationship 210 between the resistance value (or the resistance difference value) greater than the reference resistance REFR and the deformation amount value. In another example, as illustrated in FIG. 2B, the resistance-deformation amount model information stored in the resistance-deformation amount model storage 170 may represent a nonlinear relationship 220 between the resistance value (or the resistance difference value) greater than the reference resistance REFR and the deformation amount value. Further, in some embodiments, the resistance-deformation amount model storage 170 may be implemented in a form of a lookup table that outputs a corresponding deformation amount value in response to each resistance value (or each resistance difference value), but a configuration of the resistance-deformation amount model storage 170 is not limited to the lookup table.

Further, the flexible display device 100 according to embodiments may compensate the power supply voltage ELVDD supplied to the flexible display panel 110 based on the sensed resistance of the at least one measuring line ML. In a case where the flexible display panel 110 is deformed, resistances of lines of the flexible display panel 110, for example a resistance of the power supply line for supplying the power supply voltage ELVDD may be increased, and a voltage drop of the power supply voltage ELVDD may be increased by the increase of the resistance. However, in the case where the flexible display panel 110 is deformed, the flexible display device 100 according to embodiments may increase the power supply voltage ELVDD to compensate for the voltage drop of the power supply voltage ELVDD. Accordingly, even if the flexible display panel 110 is deformed and the voltage drop of the power supply voltage ELVDD is increased, deterioration of luminance uniformity and color deviation of the flexible display panel 110 may be prevented or reduced. As used herein, "deformed" means folded, bent, rolled, curved or stretched.

In some embodiments, the display driver 130 may include a resistance-voltage drop model storage 180 that stores resistance-voltage drop model information about a voltage drop amount of the power supply voltage ELVDD at the power supply line corresponding to the resistance value (or the resistance difference value) of the at least one measuring line ML. The display driver 130 may determine the voltage drop amount of the power supply voltage ELVDD corresponding to the sensed resistance of the at least one measuring line ML by using the resistance-voltage drop model information stored in the resistance-voltage drop model storage 180, and may provide the power control signal PCTRL representing an increased voltage level of the power supply voltage ELVDD to the power management circuit 120 to increase a voltage level of the power supply voltage ELVDD by the determined voltage drop amount. The power management circuit 120 may increase the voltage level of the power supply voltage ELVDD by the determined voltage drop amount in response to the power control signal PCTRL. The resistance-voltage drop model information may be stored as various forms, for example, a lookup table or an equation.

In some embodiments, the resistance-voltage drop model information stored in the resistance-voltage drop model storage 180 may be determined through experiments for the flexible display device 100. For example, as illustrated in FIG. 3A, the resistance-voltage drop model information stored in the resistance-voltage drop model storage 180 may represent a linear relationship 260 between the resistance value (or the resistance difference value) greater than the reference resistance REFR and the voltage drop amount of the power supply voltage ELVDD. In another example, as illustrated in FIG. 3B, the resistance-voltage drop model information stored in the resistance-voltage drop model storage 180 may represent a nonlinear relationship 270 between the resistance value (or the resistance difference value) greater than the reference resistance REFR and the voltage drop amount of the power supply voltage ELVDD. Further, in some embodiments, the resistance-voltage drop model storage 180 may be implemented in a form of a lookup table that outputs a corresponding voltage drop amount in response to each resistance value (or each resistance difference value), but a configuration of the resistance-voltage drop model storage 180 is not limited to the lookup table.

As described above, in the flexible display device 100 according to embodiments, the display driver 130 may sense the resistance of the at least one measuring line ML, and may detect at least one of the deformation position and the deformation amount of the flexible display panel 110 based on the sensed resistance of the at least one measuring line ML. Accordingly, the deformation position and/or the deformation amount of the flexible display panel 110 may be efficiently and accurately detected. Further, in the flexible display device 100 according to embodiments, the power supply voltage ELVDD may be compensated based on the deformation position and/or the deformation amount. Accordingly, even if the flexible display panel 110 is deformed, deterioration of luminance uniformity and color deviation of the flexible display panel 110 may be prevented or reduced.

Figure 5A:
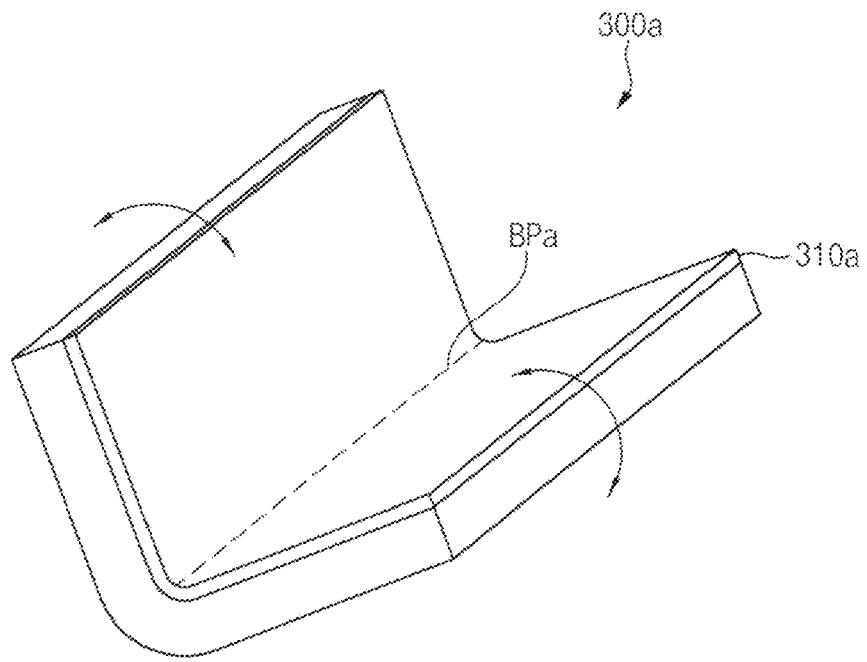
FIG. 5A is a diagram illustrating an example of a flexible display device according to embodiments.
Figure 5B:
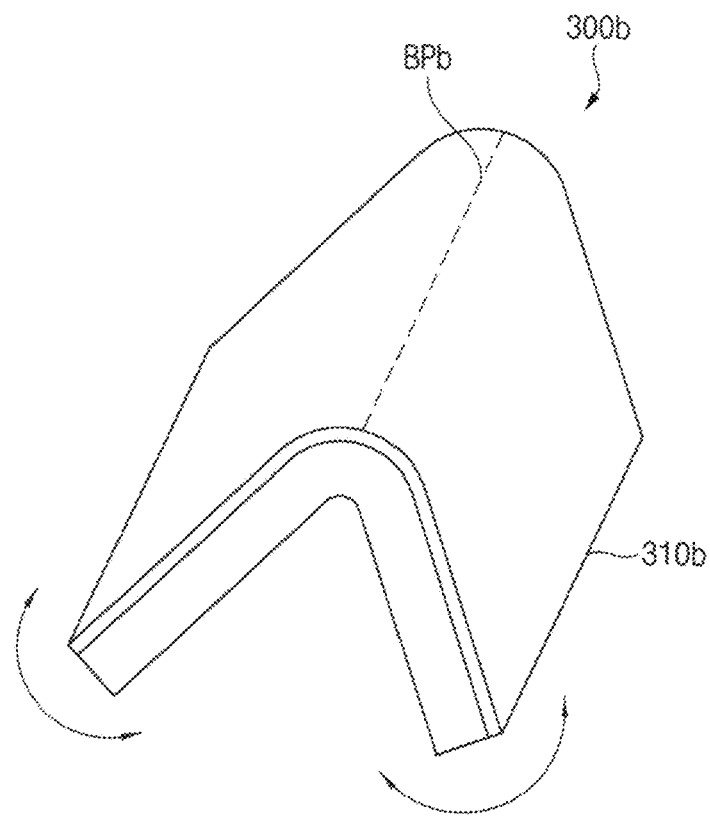
FIG. 5B is a diagram illustrating another example of a flexible display device according to embodiments.
Figure 6:
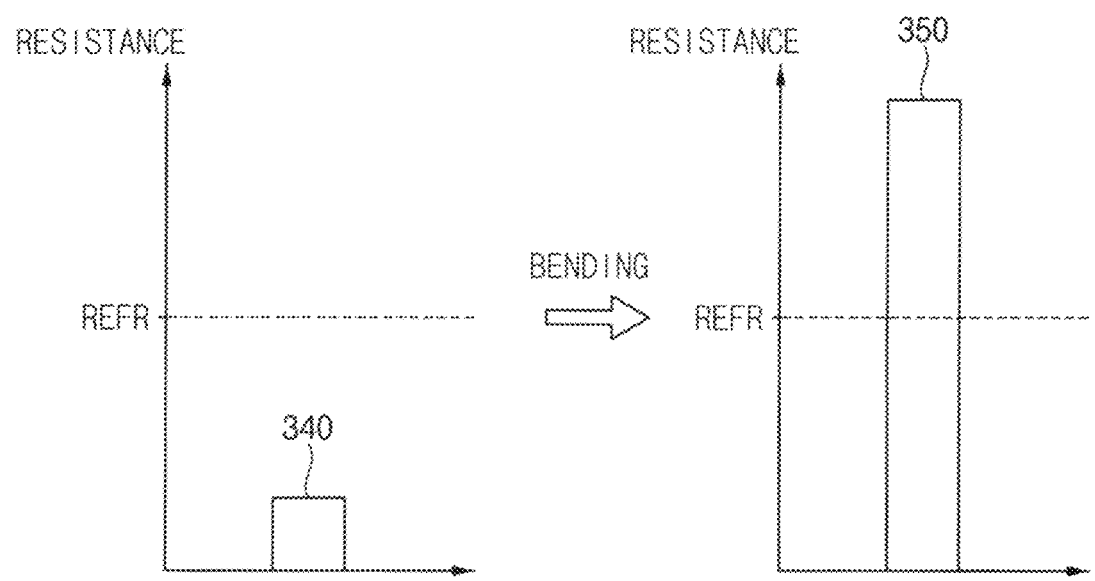
FIG. 6 is a diagram illustrating an example of resistances of an outer measuring line before and after bending of a flexible display panel.

FIG. 4 is a diagram illustrating a flexible display device having one fixed bendable position according to embodiments, FIG. 5A is a diagram illustrating an example of a flexible display device according to embodiments, FIG. 5B is a diagram illustrating another example of a flexible display device according to embodiments, and FIG. 6 is a diagram illustrating an example of resistances of an outer measuring line before and after bending of a flexible display panel.

Referring to FIG. 4, a flexible display device 300 according to embodiments may include a flexible display panel 310, a power management circuit 320 that supplies a power supply voltage ELVDD to the flexible display panel 310, and a display driver 330 that drives the flexible display panel 310.

The flexible display panel 310 may include a plurality of pixels formed in a display region DR, and a power supply line ELVDDL coupled to the plurality of pixels. The power management circuit 320 may supply the power supply voltage ELVDD to the plurality of pixels through the power supply line ELVDDL. In some embodiments, the power supply line ELVDDL may have a mesh structure.

In some embodiments, the flexible display panel 310 may be a foldable display panel having a fixed bendable position BP, and the flexible display device 300 may be a foldable display device. For example, as illustrated in FIG. 5A, the flexible display device 300 may be an in-foldable display device 300a including the foldable display panel 310a that is folded at the fixed bendable position BPa such that portions of the display region DR of the foldable display panel 310a face each other when folded. In another example, as illustrated in FIG. 5B, the flexible display device 300 may be an out-foldable display device 300b including the foldable display panel 310b that is folded at the fixed bendable position BPb such that a portion of the display region DR is located at a front side (e.g., facing a viewer) and another portion of the display region DR is located at a back side (e.g., facing away from the viewer) when folded. Although FIGS. 5A and 5B illustrate examples where the flexible display device 300 is the foldable display device 300a and 300b, the flexible display device 300 may be any flexible display device, such as a rollable display device, a curved display device, a bended display device, a stretchable display device, or the like.

Referring again to FIG. 4, the flexible display panel 310 may further include an outer measuring line OML surrounding the display region DR of the flexible display panel 310. The display driver 330 may apply a current IL to a first end of the outer measuring line OML, and may sense a resistance of the outer measuring line OML by measuring a voltage VM of a second end of the outer measuring line OML. Based on the sensed resistance of the outer measuring line OML, the display driver 330 may determine where the flexible display panel 310 is deformed, and may determine a deformation amount of the flexible display panel 310.

For example, as illustrated in FIG. 6, in a case where a resistance 340 of the outer measuring line OML is less than (or equal to) a reference resistance REFR, the display driver 330 may determine that the flexible display panel 310 is not deformed. Alternatively, in a case where a resistance 350 of the outer measuring line OML is greater than the reference resistance REFR, the display driver 330 may determine that the flexible display panel 310 is deformed, for example that the flexible display panel 310 is folded or bent. Further, the display driver 330 may determine the deformation amount of the flexible display panel 310 corresponding to the resistance 350 of the outer measuring line OML. For example, the display driver 330 may store resistance-deformation amount model information about a deformation amount value of the flexible display panel 310 corresponding to a resistance value of the outer measuring line OML, and may determine the deformation amount of the flexible display panel 310 corresponding to the resistance 350 of the outer measuring line OML by using the resistance-deformation amount model information.

In some embodiments, the flexible display device 300 according to embodiments may compensate or increase the power supply voltage ELVDD supplied to the flexible display panel 310 based on the resistance 350 of the outer measuring line OML. For example, the display driver 330 may store resistance-voltage drop model information about a voltage drop amount of the power supply voltage ELVDD at the power supply line ELVDDL corresponding to the resistance value of the outer measuring line OML, may determine the voltage drop amount of the power supply voltage ELVDD corresponding to the resistance 350 of the outer measuring line OML by using the resistance-voltage drop model information, and may increase a voltage level of the power supply voltage ELVDD by the determined voltage drop amount. Accordingly, even if the flexible display panel 310 is deformed, deterioration of an image quality of the flexible display panel 310 may be prevented or reduced.

Figure 8A:
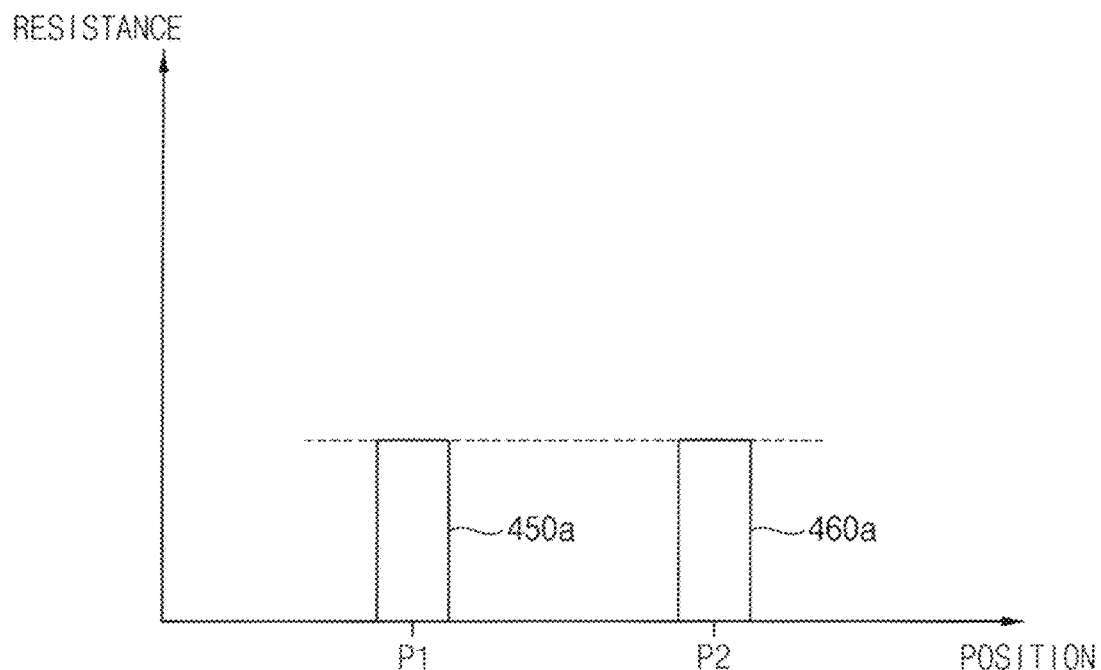
FIG. 8A is a diagram illustrating an example of resistances of first and second measuring lines in a case where a flexible display panel is not bent.
Figure 8B:
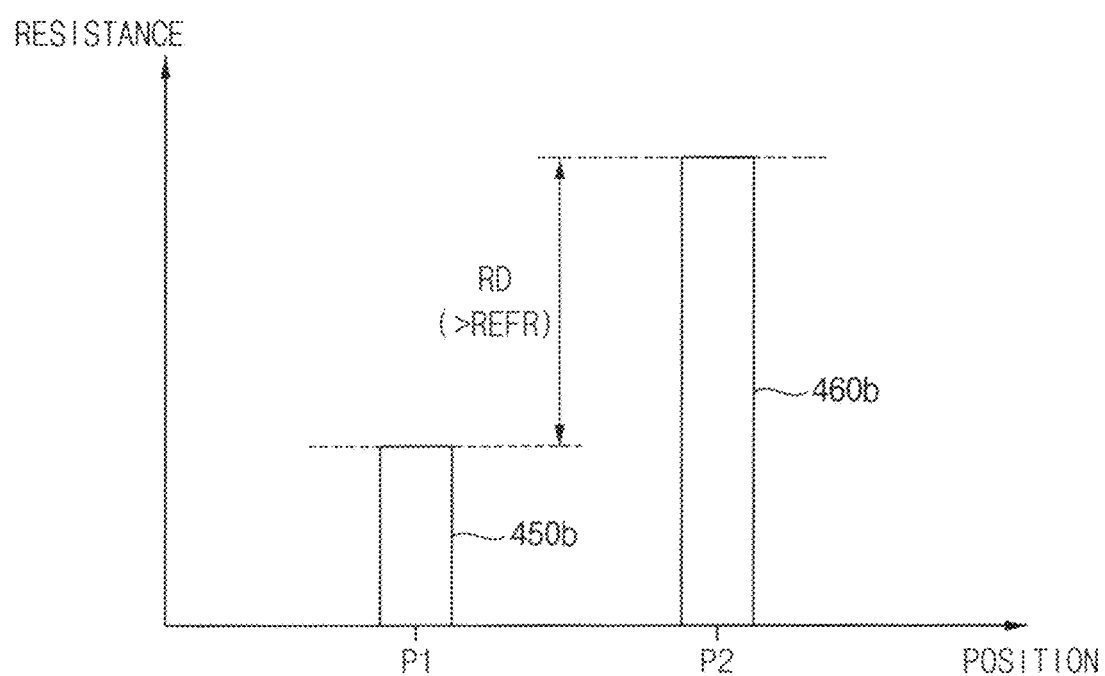
FIG. 8B is a diagram illustrating an example of resistances of first and second measuring lines in a case where a flexible display panel is bent.

FIG. 7 is a diagram illustrating a flexible display device having one fixed bendable position according to embodiments, FIG. 8A is a diagram illustrating an example of resistances of first and second measuring lines in a case where a flexible display panel is not bent, and FIG. 8B is a diagram illustrating an example of resistances of first and second measuring lines in a case where a flexible display panel is bent.

Referring to FIG. 7, a flexible display device 400 according to embodiments may include a flexible display panel 410, a power management circuit 420 and a display driver 430. The flexible display device 400 of FIG. 7 may have a similar configuration and a similar operation to a flexible display device 300 of FIG. 4, except that the flexible display panel 410 may include first and second measuring lines ML1 and ML2 instead of an outer measuring line OML.

The flexible display panel 410 may be a foldable display panel having a fixed bendable position BP, and may include a first measuring line ML1 extending from the display driver 430 to a first position P1, and a second measuring line ML2 extending from the display driver 430 to a second position P2. The first position P1 and the second position P2 are located in the flexible display panel 410. The first position P1 may be closer to the display driver 430 than the bendable position BP, and the second position P2 may be farther from the display driver 430 than the bendable position BP. For example, as illustrated in FIG. 7, the first measuring line ML1 may include a first portion MLP1 extending from the display driver 430 to the first position P1 and a second portion MLP2 extending from the first position P1 to the display driver 430, and the second measuring line ML2 may include a third portion MLP3 extending from the display driver 430 to the second position P2 and a fourth portion MLP4 extending from the second position P2 to the display driver 430.

The display driver 430 may sense a resistance of the first measuring line ML1 and a resistance of the second measuring line ML2. For example, the display driver 430 may sense the resistance of the first measuring line ML1 by applying a current to one end of the first measuring line ML1 and by measuring a voltage of the other end of the first measuring line ML1, and may sense the resistance of the second measuring line ML2 by applying a current to one end of the second measuring line ML2 and by measuring a voltage of the other end of the second measuring line ML2. Based on a difference between the resistance of the first measuring line ML1 and the resistance of the second measuring line ML2, the display driver 430 may determine where the flexible display panel 410 is deformed, and may determine a deformation amount of the flexible display panel 410.

For example, as illustrated in FIG. 8A, in a case where a difference RD between a resistance 450a of the first measuring line ML1 corresponding to the first position P1 and a resistance 460a of the second measuring line ML2 corresponding to the second position P2 is less than (or equal to) a reference resistance REFR, the display driver 430 may determine that the flexible display panel 410 is not deformed. Alternatively, in a case where a difference RD between a resistance 450b of the first measuring line ML1 corresponding to the first position P1 and a resistance 460b of the second measuring line ML2 corresponding to the second position P2 is greater than the reference resistance REFR, the display driver 430 may determine that the flexible display panel 410 is deformed, for example that the flexible display panel 410 is folded or bent. Further, the display driver 430 may determine the deformation amount of the flexible display panel 410 corresponding to the difference RD between the resistances 450b and 460b of the first and second measuring lines ML1 and ML2. For example, the display driver 430 may store resistance-deformation amount model information about a deformation amount value of the flexible display panel 410 corresponding to a resistance difference value of the first and second measuring lines ML1 and ML2, and may determine the deformation amount of the flexible display panel 410 corresponding to the difference RD between the resistances 450b and 460b of the first and second measuring lines ML1 and ML2 by using the resistance-deformation amount model information.

In some embodiments, the flexible display device 400 according to embodiments may compensate or increase a power supply voltage ELVDD supplied to the flexible display panel 410 based on the difference RD between the resistances 450b and 460b of the first and second measuring lines ML1 and ML2. For example, the display driver 430 may store resistance-voltage drop model information about a voltage drop amount of the power supply voltage ELVDD at a power supply line ELVDDL corresponding to the resistance difference value of the first and second measuring lines ML1 and ML2, may determine the voltage drop amount of the power supply voltage ELVDD corresponding to the difference RD between the resistances 450b and 460b of the first and second measuring lines ML1 and ML2 by using the resistance-voltage drop model information, and may increase a voltage level of the power supply voltage ELVDD by the determined voltage drop amount. Accordingly, even if the flexible display panel 410 is deformed, deterioration of an image quality of the flexible display panel 410 may be prevented or reduced.

Figure 10:
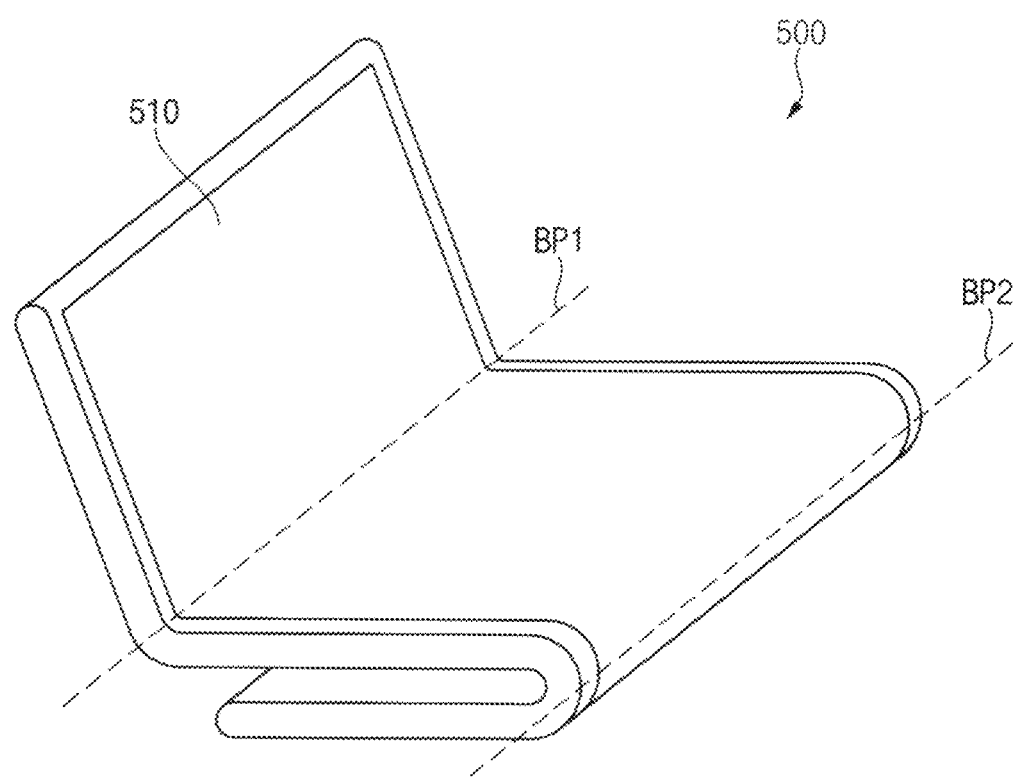
FIG. 10 is a diagram illustrating an example of a flexible display device according to embodiments.
Figure 11A:
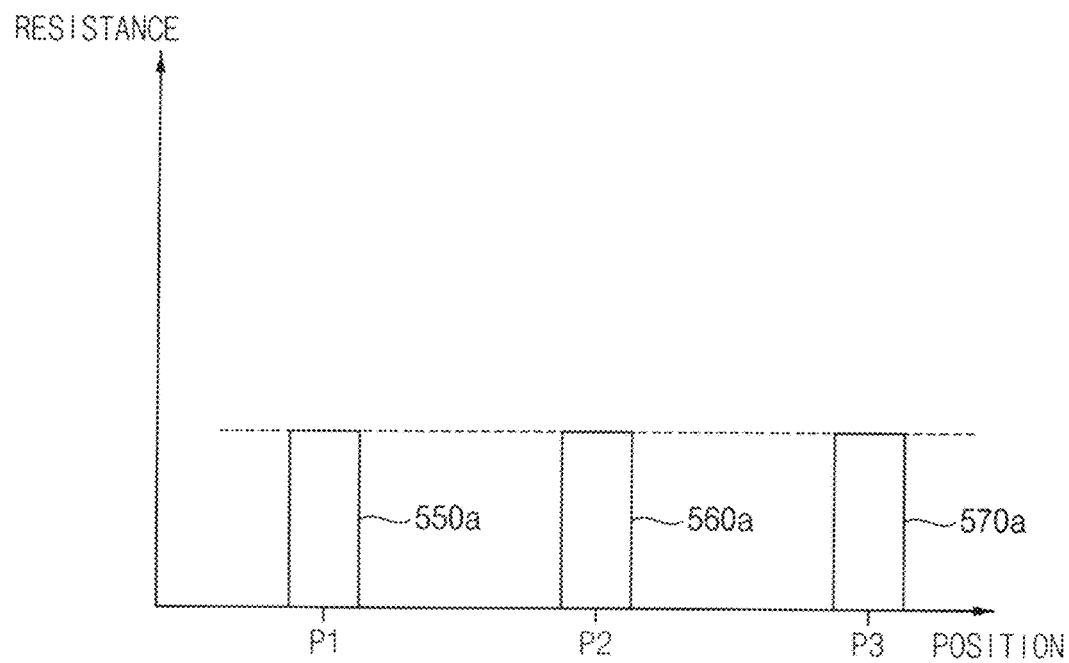
FIG. 11A is a diagram illustrating an example of resistances of first through third measuring lines in a case where a flexible display panel is not bent.
Figure 11B:
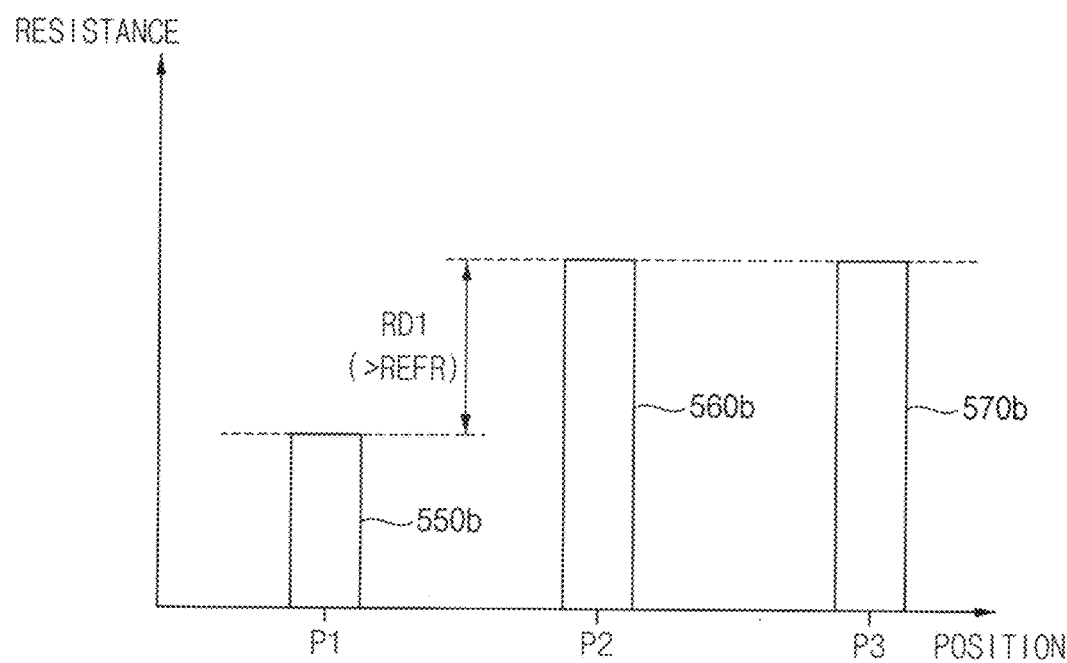
FIG. 11B is a diagram illustrating an example of resistances of first through third measuring lines in a case where a flexible display panel is bent at a first bendable position.
Figure 11C:
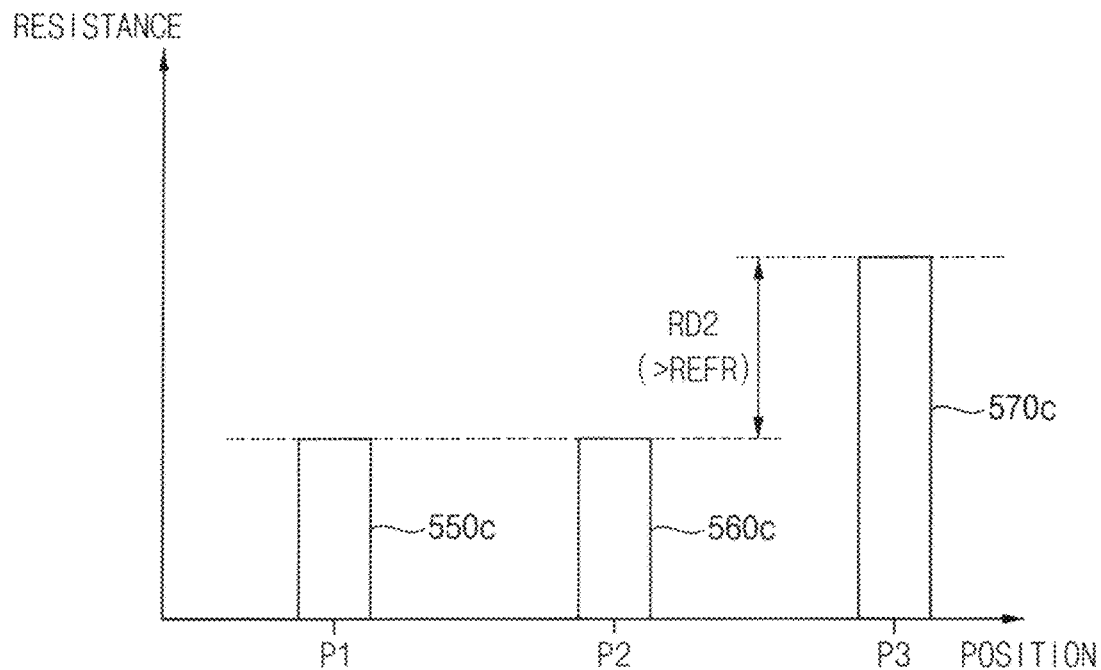
FIG. 11D is a diagram illustrating an example of resistances of first through third measuring lines in a case where a flexible display panel is bent at first and second bendable positions.
Figure 11D:
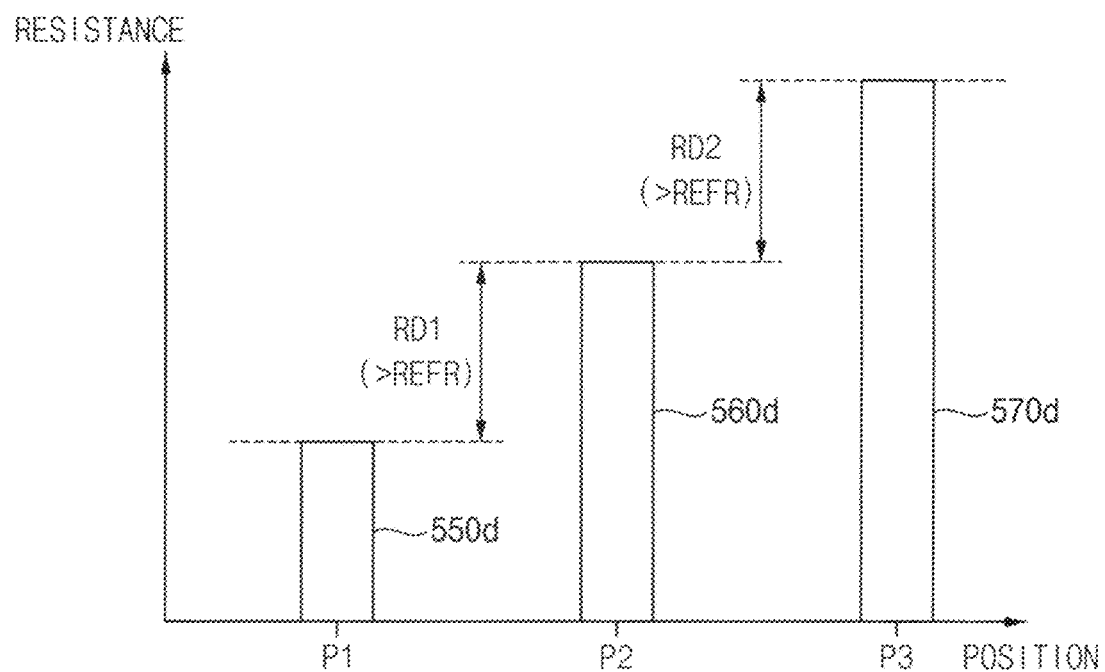

FIG. 9 is a diagram illustrating a flexible display device having two fixed bendable positions according to embodiments, FIG. 10 is a diagram illustrating an example of a flexible display device according to embodiments, FIG. 11A is a diagram illustrating an example of resistances of first through third measuring lines in a case where a flexible display panel is not bent, FIG. 11B is a diagram illustrating an example of resistances of first through third measuring lines in a case where a flexible display panel is bent at a first bendable position, FIG. 11C is a diagram illustrating an example of resistances of first through third measuring lines in a case where a flexible display panel is bent at a second bendable position, and FIG. 11D is a diagram illustrating an example of resistances of first through third measuring lines in a case where a flexible display panel is bent at first and second bendable positions.

Referring to FIG. 9, a flexible display device 500 according to embodiments may include a flexible display panel 510, a power management circuit 520 and a display driver 530. The flexible display device 500 of FIG. 9 may have a similar configuration and a similar operation to a flexible display device 300 of FIG. 4 or a flexible display device 400 of FIG. 7, except that the flexible display panel 510 may have two fixed bendable positions BP1 and BP2, and may include first, second and third measuring lines ML1, ML2 and ML3 extending to first, second and third positions P1, P2 and P3, respectively. The first, second and third positions P1, P2 and P3 are located in the flexible display panel 510.

Unlike a flexible display panel 310 of FIG. 4 or a flexible display panel 410 of FIG. 7 having one fixed bendable position BP, the flexible display panel 510 may be a foldable display panel having two fixed bendable positions BP1 and BP2. For example, as illustrated in FIG. 10, the flexible display device 500 may be a foldable display device including the flexible display panel 510 that is bent or folded at each of a first bendable position BP1 and a second bendable position BP2.

The flexible display panel 510 may include a first measuring line ML1 extending from the display driver 530 to a first position P1, a second measuring line ML2 extending from the display driver 530 to a second position P2 and a third measuring line ML3 extending from the display driver 530 to a third position P3. The first position P1 may be closer to the display driver 530 than the first bendable position BP1, the second position P2 may be farther from the display driver 530 than the first bendable position BP1 and closer to the display driver 530 than the second bendable position BP2, and the third position P3 may be farther from the display driver 530 than the second bendable position BP2.

The display driver 530 may sense a resistance of the first measuring line ML1, a resistance of the second measuring line ML2 and a resistance of the third measuring line ML3. Further, the display driver 530 may detect a deformation position and a deformation amount of the flexible display panel 510 based on differences of the resistances of the first, second and third measuring lines ML1, ML2 and ML3. In some embodiments, based on the difference between the resistance of the first measuring line ML1 and the resistance of the second measuring line ML2, the display driver 530 may determine where the flexible display panel 510 is deformed at the first bendable position BP1, and may determine the deformation amount of the flexible display panel 510 at the first bendable position BP1. Further, based on the difference between the resistance of the second measuring line ML2 and the resistance of the third measuring line ML3, the display driver 530 may determine where the flexible display panel 510 is deformed at the second bendable position BP2, and may determine the deformation amount of the flexible display panel 510 at the second bendable position BP2.

For example, as illustrated in FIG. 11A, in a case where each of a first difference RD1 between resistances 550a and 560a of the first and second measuring lines ML1 and ML2 and a second difference RD2 between resistances 560a and 570a of the second and third measuring lines ML2 and ML3 is less than (or equal to) a reference resistance REFR, the display driver 530 may determine that the flexible display panel 510 is not deformed (e.g., neither folded nor bent). In another example, as illustrated in FIG. 11B, in a case where a first difference RD1 between resistances 550b and 560b of the first and second measuring lines ML1 and ML2 is greater than the reference resistance REFR, and a second difference RD2 between resistances 560b and 570b of the second and third measuring lines ML2 and ML3 is less than (or equal to) the reference resistance REFR, the display driver 530 may determine that the flexible display panel 510 is deformed (e.g., folded or bent) at the first bendable position BP1. In still another example, as illustrated in FIG. 11C, in a case where a first difference RD1 between resistances 550c and 560c of the first and second measuring lines ML1 and ML2 is less than (or equal to) the reference resistance REFR, and a second difference RD2 between resistances 560c and 570c of the second and third measuring lines ML2 and ML3 is greater than the reference resistance REFR, the display driver 530 may determine that the flexible display panel 510 is deformed at the second bendable position BP2. In still another example, as illustrated in FIG. 11D, in a case where a first difference RD1 between resistances 550d and 560d of the first and second measuring lines ML1 and ML2 is greater than the reference resistance REFR, and a second difference RD2 between resistances 560d and 570d of the second and third measuring lines ML2 and ML3 is greater than the reference resistance REFR, the display driver 530 may determine that the flexible display panel 510 is deformed (e.g., folded or bent) at both of the first bendable position BP1 and the second bendable position BP2.

Further, the display driver 530 may determine the deformation amount at the first bendable position BP1 corresponding to the first difference RD1 between the resistances 550d and 560d of the first and second measuring lines ML1 and ML2, and may determine the deformation amount at the second bendable position BP2 corresponding to the second difference RD2 between resistances 560d and 570d of the second and third measuring lines ML2 and ML3. For example, the display driver 530 may store resistance-deformation amount model information about a deformation amount value corresponding to each resistance difference value, and may determine the deformation amount at the first bendable position BP1 corresponding to the first difference RD1 and the deformation amount at the second bendable position BP2 corresponding to the second difference RD2 by using the resistance-deformation amount model information.

In some embodiments, the flexible display device 500 may compensate or increase a power supply voltage ELVDD supplied to the flexible display panel 510 based on the differences RD1 and RD2 between the resistances 550d, 560d and 570d of the first, second and third measuring lines ML1, ML2 and ML3. Further, in some embodiments, the flexible display device 500 may compensate or increase the power supply voltage ELVDD based on a greater one of the differences RD1 and RD2 between the resistances 550d, 560d and 570d. For example, the display driver 530 may store resistance-voltage drop model information about a voltage drop amount of the power supply voltage ELVDD corresponding to each resistance difference value, may determine the voltage drop amount of the power supply voltage ELVDD corresponding to the second difference RD2 between the resistances 560d and 570d of the second and third measuring lines ML2 and ML3 by using the resistance-voltage drop model information in a case where the second difference RD2 between the resistances 560d and 570d of the second and third measuring lines ML2 and ML3 is greater than the first difference RD1 between the resistances 550d and 560d of the first and second measuring lines ML1 and ML2, and may increase a voltage level of the power supply voltage ELVDD by the determined voltage drop amount. Accordingly, even if the flexible display panel 510 is deformed, deterioration of an image quality of the flexible display panel 510 may be prevented or reduced.

Figure 13:
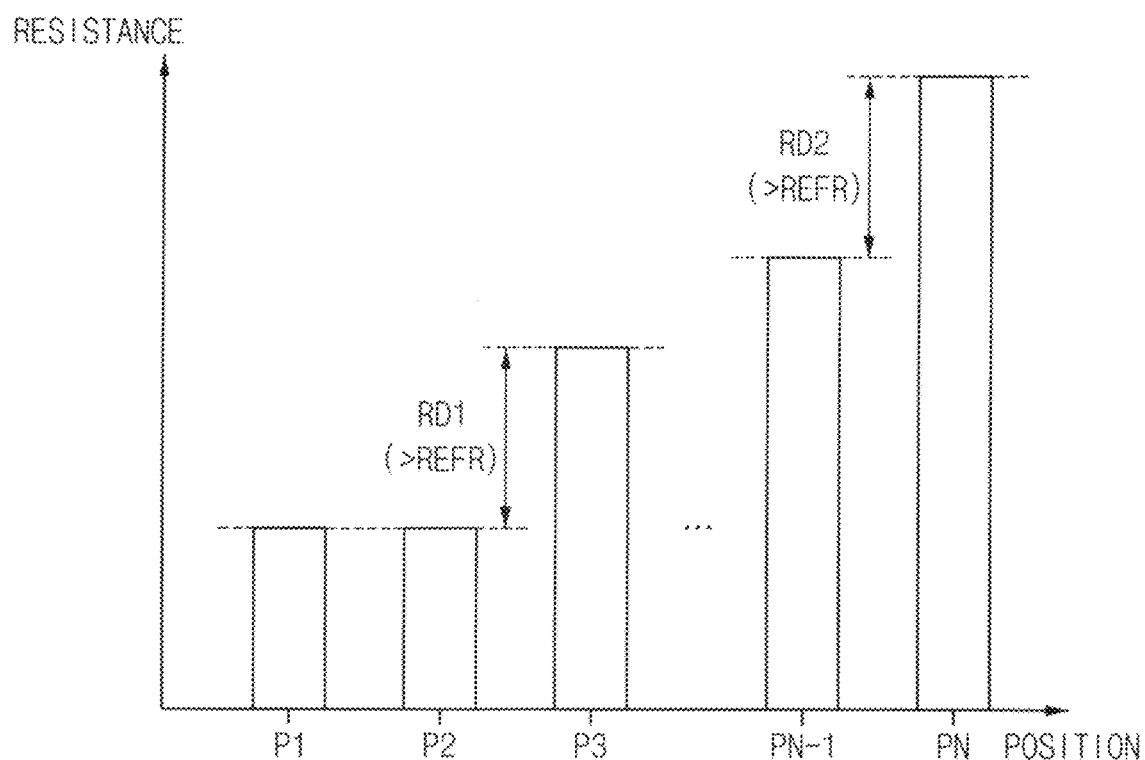
FIG. 13 is a diagram illustrating an example of resistances of a plurality of measuring lines in a case where a flexible display panel is bent.

FIG. 12 is a diagram illustrating a flexible display device including a foldable display panel that is able to be bent at any position according to embodiments, and FIG. 13 is a diagram illustrating an example of resistances of a plurality of measuring lines in a case where a flexible display panel is bent.

Referring to FIG. 12, a flexible display device 600 according to embodiments may include a flexible display panel 610, a power management circuit 620 and a display driver 630. The flexible display device 600 of FIG. 12 may have a similar configuration and a similar operation to a flexible display device 300, 400 or 500 of FIG. 4, FIG. 7 or FIG. 9, except that the flexible display panel 610 is able to be bent or folded at any position, and may include a plurality of measuring lines ML1, ML2, ML3, . . . , MLN−1 and MLN extending to a plurality of positions P1, P2, P3, . . . , PN−1 and PN, respectively. The plurality of positions P1, P2, P3, . . . , PN−1 and PN is located in the flexible display panel 610.

Unlike a flexible display panel 310, 410 or 510 of FIG. 4, FIG. 7 or FIG. 9 having one or more fixed bendable positions, the flexible display panel 610 may be a foldable display panel that is able to be bent or folded at any position.

The flexible display panel 610 may include first through N-th measuring lines ML1 through MLN extending from the display driver 630 to first through N-th positions P1 through PN, where N is an integer greater than 1. For example, the first through N-th positions P1 through PN may have, but not limited to, a regular interval.

The display driver 630 may sense resistances of the first through N-th measuring lines ML1 through MLN. Further, the display driver 630 may detect a deformation position and a deformation amount of the flexible display panel 610 based on differences of the resistances of the first through N-th measuring lines ML1 through MLN. In some embodiments, in a case where a difference between the resistances of two measuring lines extending to adjacent two positions among the first through N-th measuring lines ML1 through MLN is greater than a reference resistance, the display driver 630 may determine that the deformation position of the flexible display panel 610 is between the adjacent two positions. Further, in some embodiments, the display driver 630 may determine the deformation amount of the flexible display panel 610 at the deformation position based on the difference between the resistances of the two measuring lines.

For example, as illustrated in FIG. 13, in a case where a first difference RD1 between the resistance of the second measuring line ML2 corresponding to the second position P2 and the resistance of the third measuring line ML3 corresponding to the third position P3 is greater than the reference resistance REFR, and a second difference RD2 between the resistance of the (N−1)-th measuring line MLN−1 corresponding to the (N−1)-th position PN−1 and the resistance of the N-th measuring line MLN corresponding to the N-th position PN is greater than the reference resistance REFR, the display driver 630 may determine that the flexible display panel 610 is deformed at a first deformation position (e.g., a first bendable position) between the second position P2 and the third position P3, and that the flexible display panel 610 is further deformed at a second deformation position (e.g., a second bendable position) between the (N−1)-th position PN−1 and the N-th position PN.

In some embodiments, the flexible display device 600 may compensate or increase a power supply voltage ELVDD supplied to the flexible display panel 610 based on the differences of the resistances of the first through N-th measuring lines ML1 through MLN. Further, in some embodiments, the flexible display device 600 may compensate or increase the power supply voltage ELVDD based on a greatest one of the differences of the resistances. For example, in a case where the second difference RD2 between the resistances of the (N−1)-th and N-th measuring lines MLN−1 and MLN is greatest, the display driver 630 may determine a voltage drop amount of the power supply voltage ELVDD corresponding to the second difference RD2 between the resistances of the (N−1)-th and N-th measuring lines MLN−1 and MLN, and may increase a voltage level of the power supply voltage ELVDD by the determined voltage drop amount. Accordingly, even if the flexible display panel 610 is deformed, deterioration of an image quality of the flexible display panel 610 may be prevented or reduced.

Figure 14:
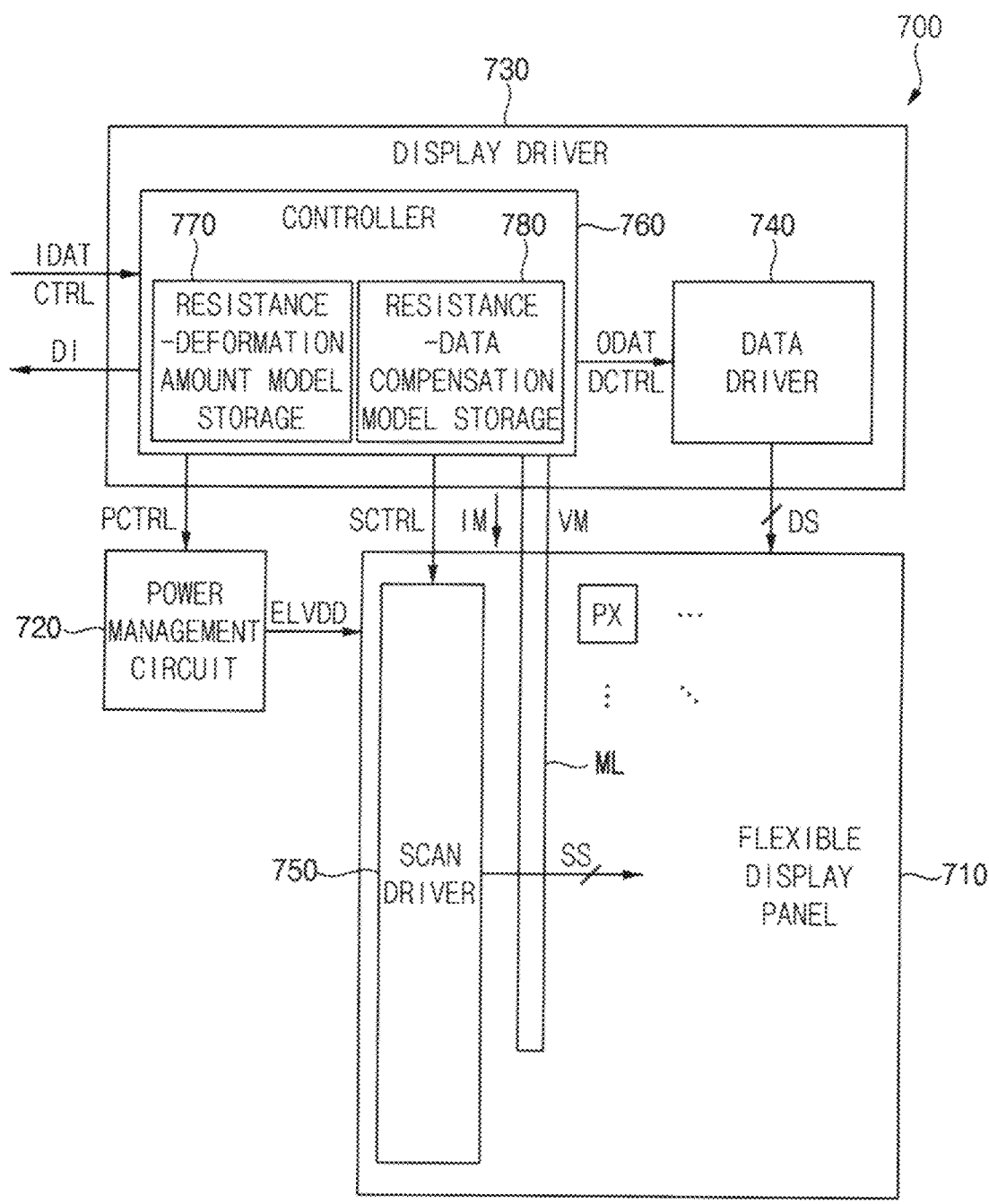
FIG. 14 is a block diagram illustrating a flexible display device according to embodiments.
Figure 15A:
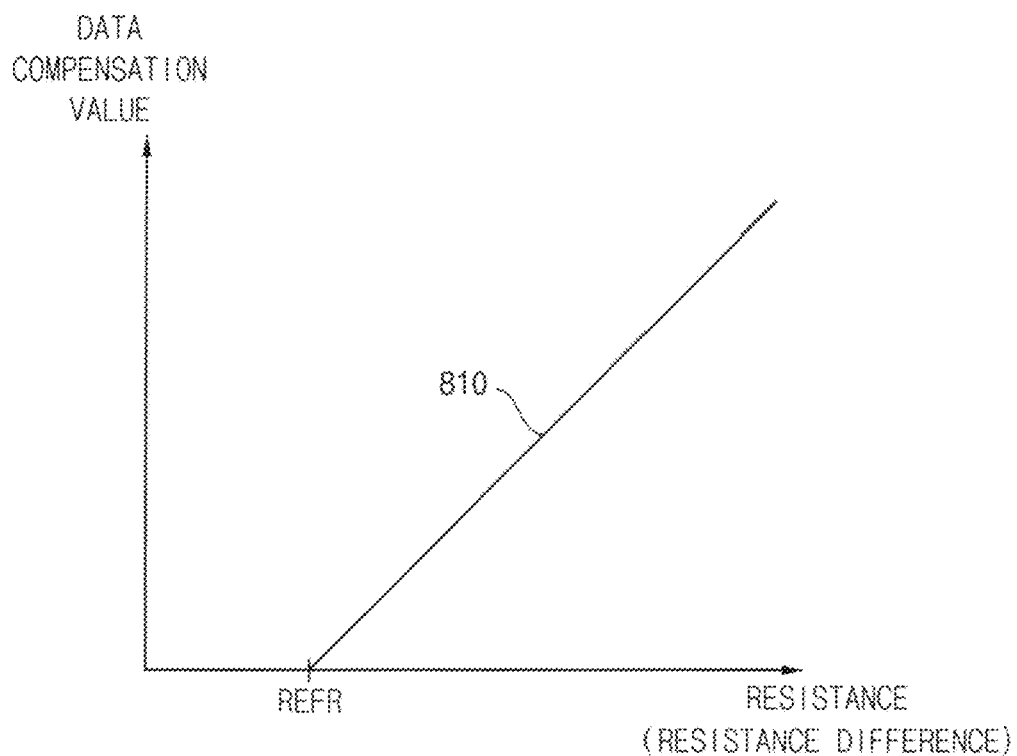
FIG. 15A is a diagram illustrating an example of a resistance-data compensation model.
Figure 15B:
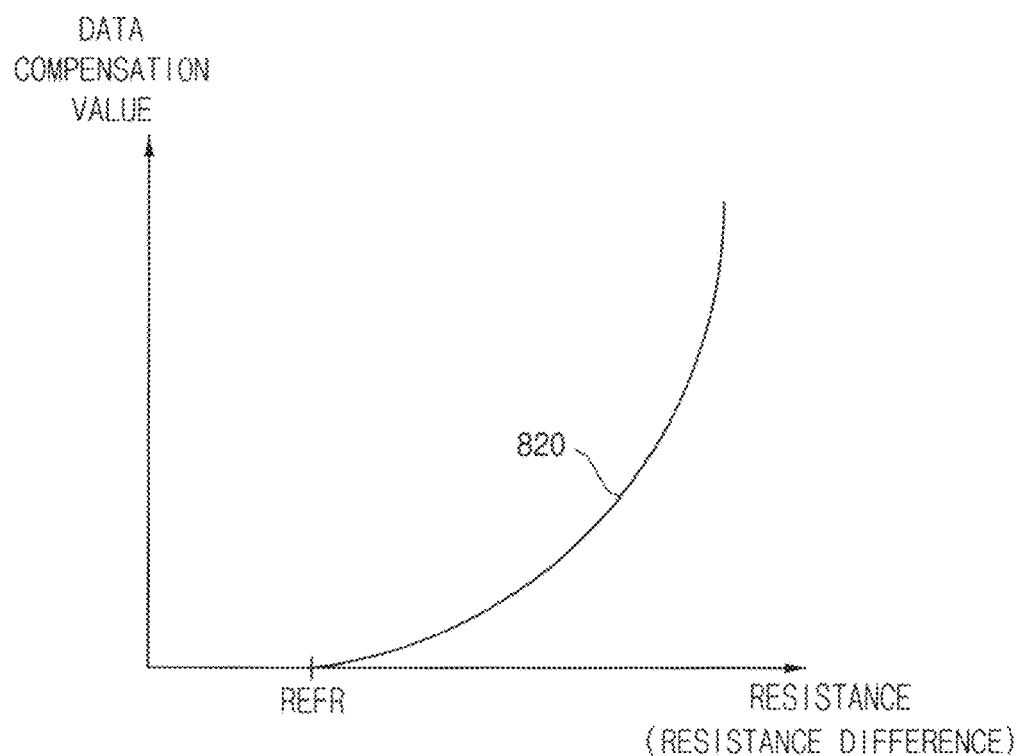
FIG. 15B is a diagram illustrating another example of a resistance-data compensation model.

FIG. 14 is a block diagram illustrating a flexible display device according to embodiments, FIG. 15A is a diagram illustrating an example of a resistance-data compensation model, and FIG. 15B is a diagram illustrating another example of a resistance-data compensation model.

Referring to FIG. 14, a flexible display device 700 according to embodiments may include a flexible display panel 710, a power management circuit 720 and a display driver 730. The display driver 730 may include a data driver 740 and a controller 760. The controller 760 may include a resistance-deformation amount model storage 770 and a resistance-data compensation model storage 780. Here, the resistance-deformation amount model storage 170, the resistance-voltage drop model storage 180, the resistance-deformation amount model storage 770, and the resistance-data compensation model storage 780 may be implemented by a storage device such as memory. In some embodiments, the flexible display device 700 may further include a scan driver 750. The flexible display device 700 of FIG. 14 may have a similar configuration and a similar operation to a flexible display device 100 of FIG. 1, except that the display driver 730 may include the resistance-data compensation model storage 780, and may compensate input image data IDAT instead of or along with a power supply voltage ELVDD based on a resistance of at least one measuring line ML.

The resistance-data compensation model storage 780 may store resistance-data compensation model information about a data compensation value corresponding to a resistance value (or a resistance difference value) of the at least one measuring line ML. The display driver 730 may sense a resistance of the at least one measuring line ML, and may generate output image data ODAT by compensating the input image data IDAT based on the sensed resistance of the at least one measuring line ML and the resistance-data compensation model information stored in the resistance-data compensation model storage 780. In some embodiments, the display driver 730 may determine the data compensation value corresponding to the sensed resistance of the at least one measuring line ML based on the resistance-data compensation model information, and may generate the output image data ODAT for each pixel PX by adding the data compensation value to a gray level represented by the input image data IDAT with respect to each pixel PX. The resistance-data compensation model information may be stored as various forms, for example, a lookup table or an equation.

In some embodiments, the resistance-data compensation model information stored in the resistance-data compensation model storage 780 may be determined through experiments for the flexible display device 700. For example, as illustrated in FIG. 15A, the resistance-data compensation model information stored in the resistance-data compensation model storage 780 may represent a linear relationship 810 between the resistance value (or the resistance difference value) greater than a reference resistance REFR and the data compensation value. In another example, as illustrated in FIG. 15B, the resistance-data compensation model information stored in the resistance-data compensation model storage 780 may represent a nonlinear relationship 820 between the resistance value (or the resistance difference value) greater than the reference resistance REFR and the data compensation value. Further, in some embodiments, the resistance-data compensation model storage 780 may be implemented in a form of a lookup table that outputs a corresponding data compensation value in response to each resistance value (or each resistance difference value), but a configuration of the resistance-data compensation model storage 780 is not limited to the lookup table.

In the flexible display device 700 according to embodiments, the display driver 730 may sense the resistance of the at least one measuring line ML, and may detect at least one of a deformation position and a deformation amount of the flexible display panel 710 based on the sensed resistance of the at least one measuring line ML. Further, in the flexible display device 700 according to embodiments, the input image data IDAT may be compensated based on the deformation position and/or the deformation amount. Accordingly, even if the flexible display panel 710 is deformed, deterioration of luminance uniformity and color deviation of the flexible display panel 710 may be prevented or reduced.

Figure 16:
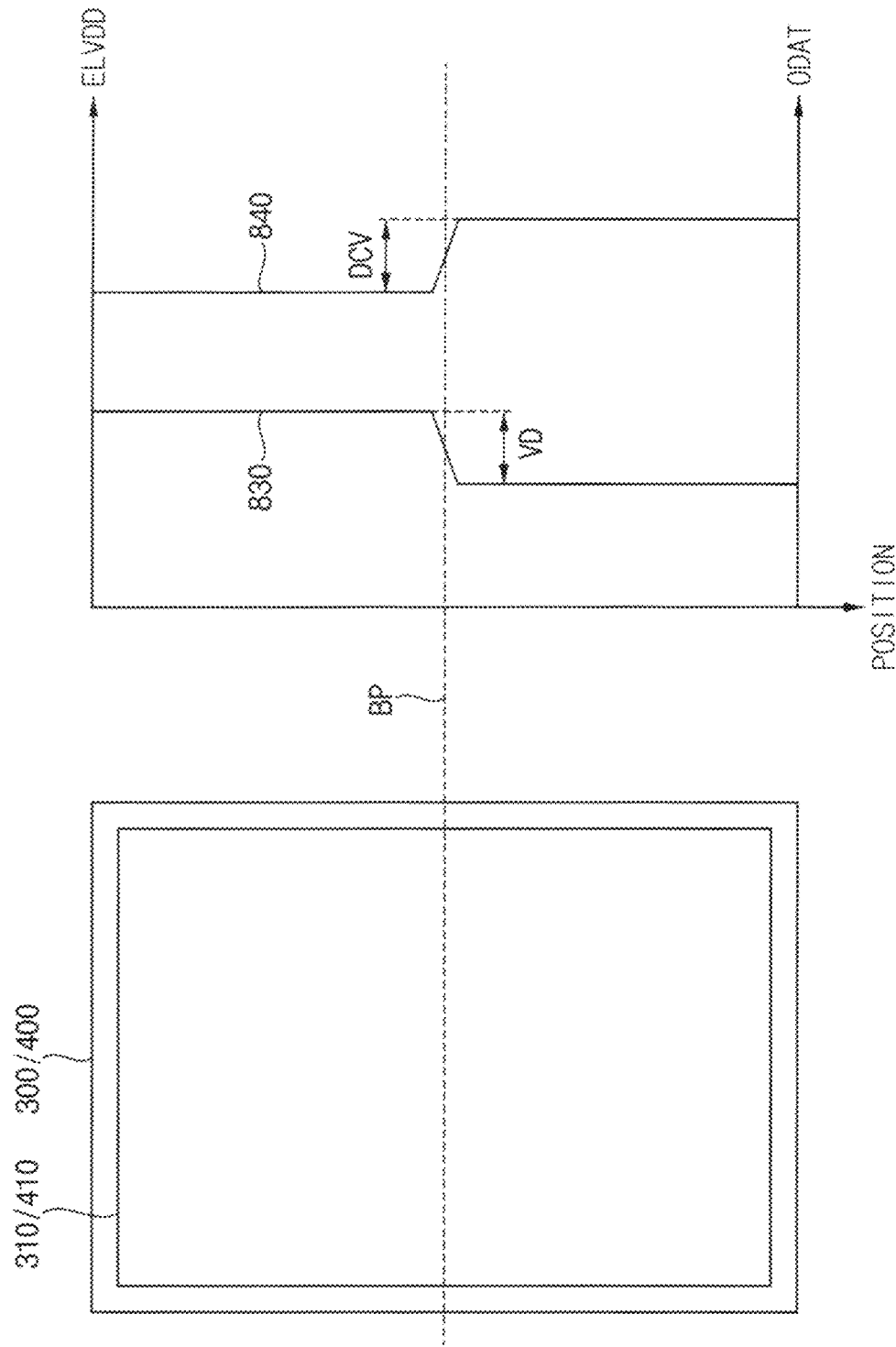
FIG. 16 is a diagram for describing an example where input image data are compensated in a flexible display device having one fixed bendable position.

FIG. 16 is a diagram for describing an example where input image data are compensated in a flexible display device having one fixed bendable position.

Referring to FIG. 16, a flexible display panel 310/410 of a flexible display device 300/400 may have one fixed bendable position BP. For example, the flexible display device 300/400 may be a flexible display device 300 of FIG. 4 or a flexible display device 400 of FIG. 7. The flexible display panel 310/410 may include, as least one measuring line, an outer measuring line OML as illustrated in FIG. 4, or first and second measuring lines ML1 and ML2 corresponding to first and second positions P1 and P2 as illustrated in FIG. 7.

If the flexible display panel 310/410 is deformed (e.g., bent or folded) at the bendable position BP, a power supply voltage ELVDD may be decreased by a voltage drop VD at the bendable position BP and positions farther from the display driver 330/430 than the bendable position BP as illustrated as a graph 830. However, the flexible display device 300/400 may sense a resistance of the as least one measuring line, and may generate output image data ODAT by increasing input image data IDAT for a plurality of pixels located farther from the display driver 330/430 than the bendable position BP (e.g., for a plurality of pixels located at a lower portion below the bendable position BP) by a data compensation value DCV based on the resistance of the as least one measuring line as illustrated as a graph 840. Accordingly, even if the flexible display panel 310/410 is deformed, deterioration of an image quality of the flexible display panel 310/410 may be effectively prevented or reduced.

Figure 17:
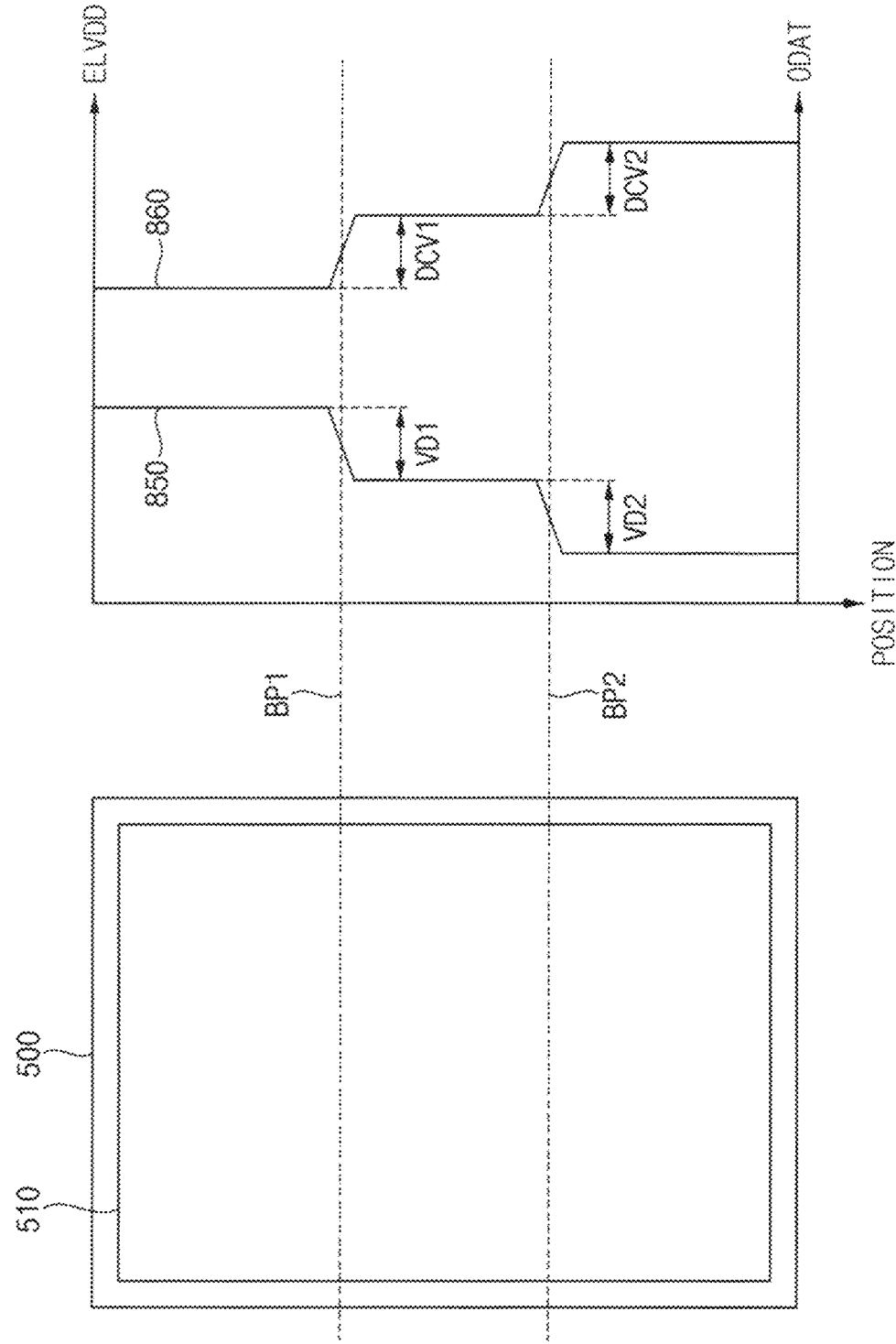
FIG. 17 is a diagram for describing an example where input image data are compensated in a flexible display device having two fixed bendable positions.

FIG. 17 is a diagram for describing an example where input image data are compensated in a flexible display device having two fixed bendable positions.

Referring to FIG. 17, a flexible display panel 510 of a flexible display device 500 may have two fixed bendable position BP1 and BP2. The flexible display panel 510 may include, as least one measuring line, first, second and third measuring lines ML1, ML2 and ML3 corresponding to first, second and third positions P1, P2 and P3 as illustrated in FIG. 9.

If the flexible display panel 510 is deformed (e.g., bent or folded) at the first and second bendable positions BP1 and BP2, a power supply voltage ELVDD may be decreased by first and second voltage drops VD1 and VD2 at the first and second bendable positions BP1 and BP2 as illustrated as a graph 850. However, the flexible display device 500 may sense a resistance of the as least one measuring line, and may generate output image data ODAT by increasing input image data IDAT for a plurality of pixels located farther from the display driver 330/430 than the first bendable position BP1 (e.g., for a plurality of pixels located at a lower portion below the first bendable position BP1) by a first data compensation value DCV1 and by further increasing the input image data IDAT for a plurality of pixels located farther from the display driver 330/430 than the second bendable position BP2 (e.g., for a plurality of pixels located at a lower portion below the second bendable position BP2) by a second data compensation value DCV2 based on the resistance of the as least one measuring line as illustrated as a graph 860. Accordingly, even if the flexible display panel 510 is deformed, deterioration of an image quality of the flexible display panel 510 may be effectively prevented or reduced.

Figure 18:
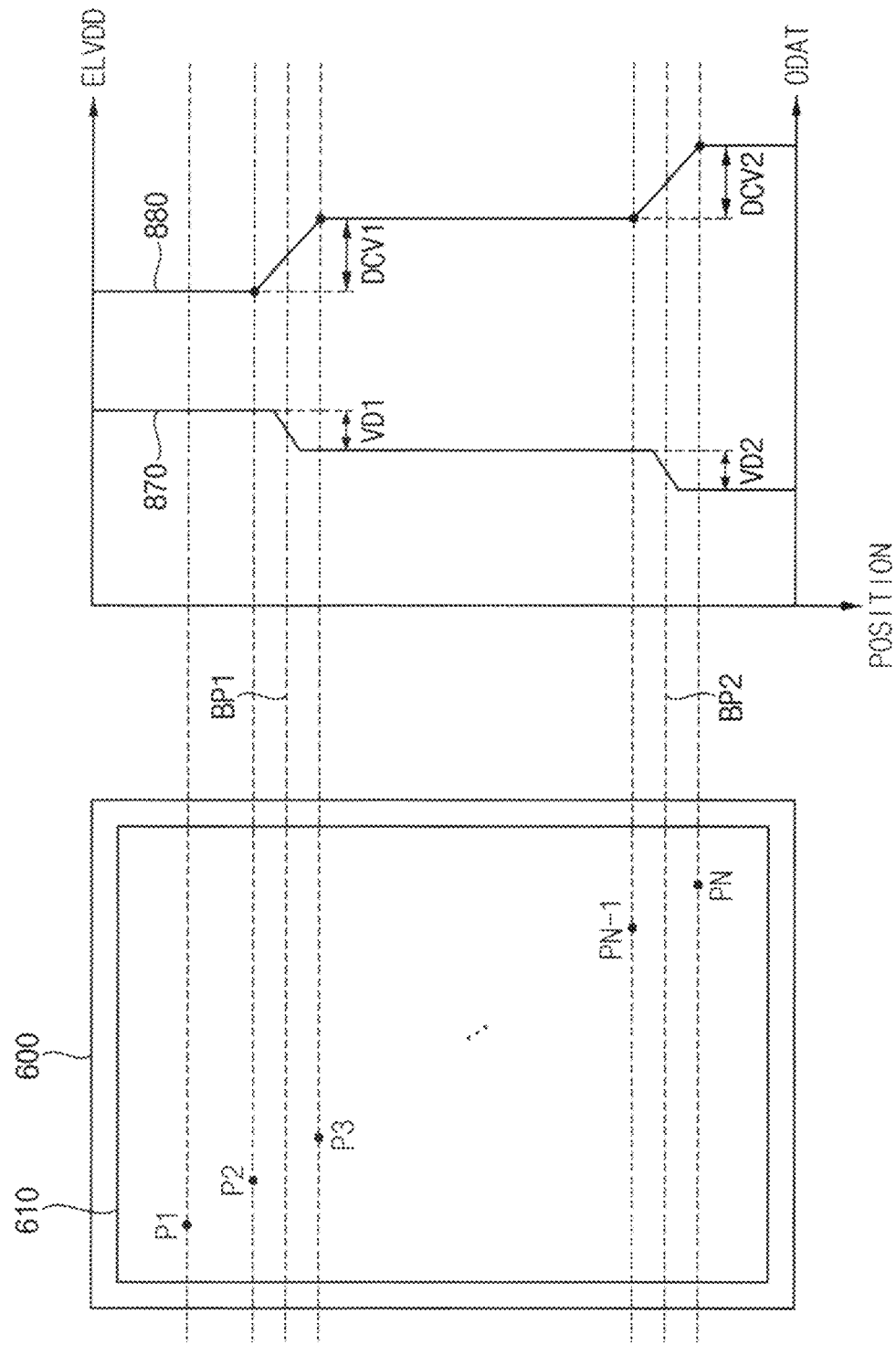
FIG. 18 is a diagram for describing an example where input image data are compensated in a flexible display device including a foldable display panel that is able to be bent at any position.

FIG. 18 is a diagram for describing an example where input image data are compensated in a flexible display device including a foldable display panel that is able to be bent at any position.

Referring to FIG. 18, a flexible display panel 610 of a flexible display device 600 may be deformed (e.g., bent or folded) at any position. The flexible display panel 610 may include, as least one measuring line, first through N-th measuring lines ML1 through MLN corresponding to first through N-th positions P1 through PN as illustrated in FIG. 12.

If the flexible display panel 610 is deformed (e.g., bent or folded) at first and second bendable positions BP1 and BP2 that are not fixed (not predetermined), for example, the flexible display device 600 may determine that the first bendable position BP1 is between the second position P2 and the third position P3 and that the second bendable position BP2 is between the (N−1)-th position PN−1 and the N-th position PN by sensing resistances of the first through N-th measuring lines ML1 through MLN Further, if the flexible display panel 610 is deformed at the first and second bendable positions BP1 and BP2, a power supply voltage ELVDD may be decreased by first and second voltage drops VD1 and VD2 at the first and second bendable positions BP1 and BP2 as illustrated as a graph 870. However, as illustrated as a graph 880, the flexible display device 600 may generate output image data ODAT by gradually increasing input image data IDAT by up to a first data compensation value DCV1 between the second position P2 and the third position P3, by keeping the first data compensation value DCV1 between the third position P3 and the (N−1)-th position PN−1 and by further gradually increasing the input image data IDAT by up to a second data compensation value DCV2 between the (N−1)-th position PN−1 and the N-th position PN. Accordingly, even if the flexible display panel 610 is deformed, deterioration of an image quality of the flexible display panel 610 may be effectively prevented or reduced.

Figure 19:
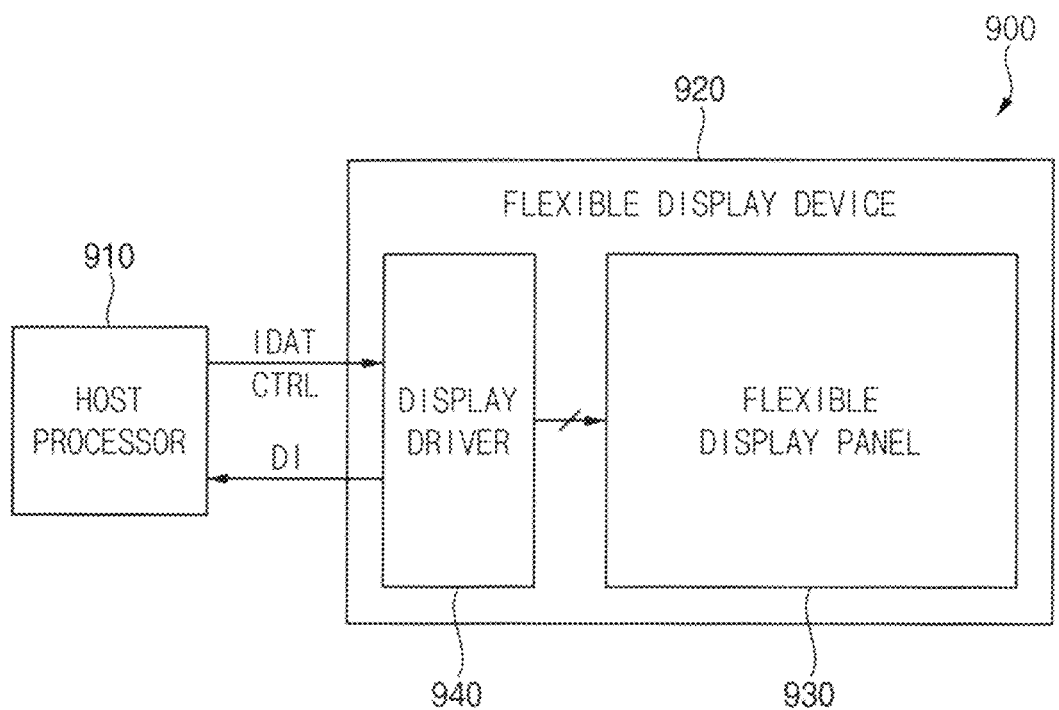
FIG. 19 is a block diagram illustrating an electronic device including a flexible display device according to embodiments.
Figure 20:
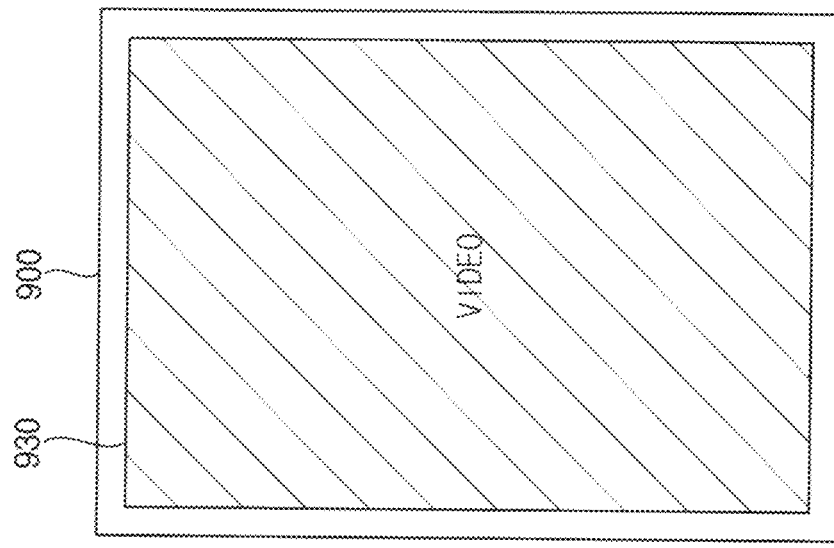
FIG. 20 is a diagram for describing an example where a region displaying a moving image is changed in a case where a flexible display panel is deformed.
Figure 20:
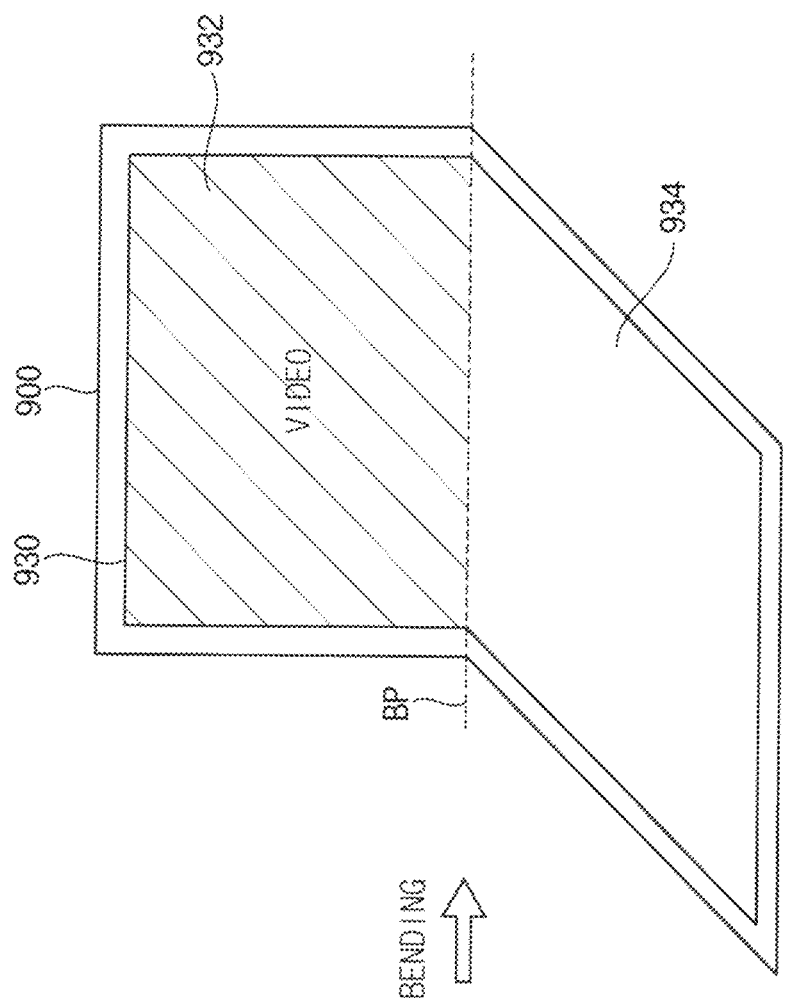

FIG. 19 is a block diagram illustrating an electronic device including a flexible display device according to embodiments, and FIG. 20 is a diagram for describing an example where a region displaying a moving image is changed in a case where a flexible display panel is deformed.

Referring to FIG. 19, an electronic device 900 according to embodiments may include a host processor 910 and a flexible display device 920. In some embodiments, the electronic device 900 may further include a memory device, a storage device, an input/output device, a power supply, etc.

The host processor 910 may control an overall operation of the electronic device 900. According to embodiments, the host processor 910 may be an application processor (AP) including a graphics processing unit (GPU), a microprocessor, a central processing unit ("CPU"), etc. The host processor 910 may generate input image data IDAT and a control signal CTRL, and may provide the input image data IDAT and the control signal CTRL to the flexible display device 920. Further, the host processor 910 may receive deformation information DI representing a deformation position and/or a deformation amount of a flexible display panel 930 from the flexible display device 920.

The flexible display device 920 may display an image based on the input image data IDAT. The flexible display device 920 may include the flexible display panel 930 including a plurality of pixels, and a display driver 940 that drives the flexible display panel 930. The flexible display panel 930 may further include at least one measuring line. The display driver 940 may sense a resistance of the at least one measuring line, and may detect at least one of the deformation position and the deformation amount of the flexible display panel 930 based on the sensed resistance. The display driver 940 may provide the deformation information DI representing at least one of the deformation position and the deformation amount to the host processor 910.

In some embodiments, the host processor 910 may control a user interface based on the deformation information DI. For example, as illustrated in FIG. 20, in a case where, while the flexible display panel 930 displays a moving image or a video, the host processor 910 receives the deformation information DI indicating that the flexible display panel 930 is deformed, the host processor 910 may adjust the input image data IDAT in response to the deformation information DI such that a region of the flexible display panel 930 displaying the moving image is changed. For example, in a case where the flexible display panel 930 is deformed while the moving image is displayed at the entire display region of the flexible display panel 930, the host processor 910 may adjust the input image data IDAT such that the moving image is displayed at a first area 932 of the display region of the flexible display panel 930. Further, in some embodiments, the host processor 910 may adjust the input image data IDAT such that no image is displayed at a second area 934 of the display region of the flexible display panel 930, or such that a user interface image (e.g., a keyboard image or information image) is displayed at the second area 934 of the display region of the flexible display panel 930.

The inventive concepts may be applied to any electronic device 900 including the flexible display device 920, such as a mobile phone, a smart phone, a tablet computer, a television ("TV"), a digital TV, a 3D TV, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A flexible display device comprising:
   a flexible display panel including a plurality of pixels, a power supply line coupled to the plurality of pixels, and at least two measuring lines;
   a power management circuit, which supplies a power supply voltage to the plurality of pixels through the power supply line; and
   a display driver, which drives the flexible display panel, senses resistances of the at least two measuring lines, and detects at least one of a deformation position and a deformation amount of the flexible display panel based on the sensed resistances,
   wherein the at least two measuring lines includes a first measuring line extending from the display driver and ending at a first position and a second measuring line extending from the display driver and ending at a second position,
   wherein the display driver detects that the deformation position is located between the first position and the second position based on that a difference between values of the sensed resistances of the first measuring line and the second measuring line is greater than a reference value.

2. The flexible display device of claim 1, wherein the display driver includes:
   a resistance-deformation amount model storage, which store resistance-deformation amount model information about a deformation amount value of the flexible display panel corresponding to a difference between values of the sensed resistances of the at least two measuring lines.

3. The flexible display device of claim 1, wherein the display driver includes:

a resistance-voltage drop model storage, which store resistance-voltage drop model information about a voltage drop amount of the power supply voltage at the power supply line corresponding to the difference between the values of the sensed resistances of the at least two measuring lines.

4. The flexible display device of claim 3, wherein the display driver determines the voltage drop amount of the power supply voltage corresponding to the difference between the values of the sensed resistances of the at least two measuring lines by using the resistance-voltage drop model information, and
wherein the power management circuit increases a voltage level of the power supply voltage by the determined voltage drop amount.

5. The flexible display device of claim 1, wherein the flexible display panel is a foldable display panel having a fixed bendable position, and
wherein the first position is closer to the display driver than the bendable position, and the second position is farther from the display driver than the bendable position,
wherein the first and second positions are located in the flexible display panel.

6. The flexible display device of claim 5, wherein the display driver senses a first resistance as the sensed resistance of the first measuring line and a second resistance as the sensed resistance of the second measuring line, and
wherein the display driver detects the deformation amount of the flexible display panel based on the difference between the first resistance of the first measuring line and the second resistance of the second measuring line.

7. The flexible display device of claim 1, wherein the flexible display panel is a foldable display panel having a fixed first bendable position and a fixed second bendable position, and
wherein the flexible display panel includes, as the at least two measuring lines, the first measuring line extending from the display driver to the first position that is closer to the display driver than the first bendable position, the second measuring line extending from the display driver to the second position that is farther from the display driver than the first bendable position and closer to the display driver than the second bendable position, and a third measuring line extending from the display driver to a third position that is farther from the display driver than the second bendable position,
wherein the first, second, third positions are located in the flexible display panel.

8. The flexible display device of claim 7, wherein the display driver senses a first resistance as the sensed resistance of the first measuring line, a second resistance as the sensed resistance of the second measuring line and a third resistance of the third measuring line,
wherein, based on a first difference between the first resistance of the first measuring line and the second resistance of the second measuring line, the display driver detects whether the flexible display panel is bent at the first bendable position, and detects the deformation amount at the first bendable position, and
wherein, based on a second difference between the second resistance of the second measuring line and the third resistance of the third measuring line, the display driver detects whether the flexible display panel is bent at the second bendable position, and detects the deformation amount at the second bendable position.

9. The flexible display device of claim 1, wherein the flexible display panel is a foldable display panel that is able to be bent at any position therein, and
wherein the flexible display panel includes, as the at least two measuring lines, a plurality of measuring lines extending from the display driver to different positions, respectively.

10. The flexible display device of claim 9, wherein the display driver senses resistances of the plurality of measuring lines, and
wherein, based on that a difference between the resistances of two measuring lines extending to adjacent two positions among the plurality of measuring lines is greater than the threshold value, the display driver determines that the deformation position of the flexible display panel is between the adjacent two positions.

11. The flexible display device of claim 10, wherein the display driver detects the deformation amount at the deformation position based on the difference between the resistances of the two measuring lines.

12. The flexible display device of claim 1, wherein the display driver includes:
a resistance-data compensation model storage, which stores resistance-data compensation model information about a data compensation value corresponding to a difference between the values of the sensed resistances of the at least two measuring lines.

13. The flexible display device of claim 12, wherein the display driver compensates input image data based on the difference between the values of the sensed resistances of the at least two measuring lines and the resistance-data compensation model information.

14. The flexible display device of claim 12, wherein the display driver determines the data compensation value corresponding to the difference between the values of the sensed resistances of the at least two measuring lines based on the resistance-data compensation model information, and compensates input image data by adding the data compensation value to a gray level represented by the input image data.

15. The flexible display device of claim 1, wherein the flexible display panel includes, as the at least two measuring lines, a plurality of measuring lines extending from the display driver to different positions, respectively,
wherein the display driver senses resistances of the plurality of measuring lines, and
wherein, based on that a difference between the resistances of two measuring lines extending to adjacent two positions of the different positions among the plurality of measuring lines is greater than the reference value, the display driver compensates input image data by gradually increasing the input image data for pixels of the plurality of pixels located between the adjacent two positions and located farther from the display driver than the adjacent two positions.

16. A flexible display device comprising:
a flexible display panel including a plurality of pixels, and a power supply line coupled to the plurality of pixels;
a power management circuit, which supplies a power supply voltage to the plurality of pixels through the power supply line; and
a display driver, which drives the flexible display panel,
wherein the flexible display panel further includes:
a plurality of measuring lines extending from the display driver and ending at different positions, respectively, and wherein the display driver is further configured to:
sense resistances of the plurality of measuring lines; and
detect that a deformation position is located between two adjacent positions of the different positions based on that a difference between values of the sensed resistances of two measuring lines ending at the two adjacent positions is greater than a reference value.

17. An electronic device comprising:

a host processor, which generates input image data; and a flexible display device, which displays an image based on the input image data, wherein the flexible display device includes:
   a flexible display panel including a plurality of pixels, a power supply line coupled to the plurality of pixels, and at least two measuring lines;
   a power management circuit, which supplies a power supply voltage to the plurality of pixels through the power supply line; and
   a display driver, which drives the flexible display panel, and wherein the display driver senses resistances of the at least two measuring lines, detects at least one of a deformation position and a deformation amount of the flexible display panel based on the sensed resistances, and provides deformation information representing the at least one of the deformation position and the deformation amount to the host processor, wherein the at least two measuring lines includes a first measuring line extending from the display driver and ending at a first position and a second measuring line extending from the display driver and ending at a second position, wherein the display driver detects that the deformation position is located between the first position and the second position based on that a difference between values of the sensed resistances of the first measuring line and the second measuring line is greater than a reference value.

18. The electronic device of claim 17, wherein, based on that the deformation information indicates that the flexible display panel is deformed while the flexible display panel displays a moving image, the host processor adjusts the input image data based on the deformation information such that a region of the flexible display panel displaying the moving image is changed.

* * * * *